US012004195B2

(12) United States Patent
Abedini et al.

(10) Patent No.: US 12,004,195 B2
(45) Date of Patent: Jun. 4, 2024

(54) LOCAL COORDINATION TO SUPPORT SPATIAL DIVISION MULTIPLEX OPERATION IN INTEGRATED ACCESS AND BACKHAUL NETWORKS

(71) Applicant: QUALCOMM Incorporated, San Diego, CA (US)

(72) Inventors: Navid Abedini, Basking Ridge, NJ (US); Jianghong Luo, Skillman, NJ (US); Andrzej Partyka, Bedminster, NJ (US); Luca Blessent, Whitehouse Station, NJ (US); Karl Georg Hampel, Jersey City, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/806,819

(22) Filed: Jun. 14, 2022

(65) Prior Publication Data

US 2022/0312408 A1    Sep. 29, 2022

Related U.S. Application Data

(63) Continuation of application No. 16/833,281, filed on Mar. 27, 2020, now Pat. No. 11,382,093.

(Continued)

(51) Int. Cl.
*H04W 72/27*    (2023.01)
*H04B 7/06*    (2006.01)
(Continued)

(52) U.S. Cl.
CPC .......... *H04W 72/27* (2023.01); *H04B 7/0697* (2013.01); *H04W 72/046* (2013.01);
(Continued)

(58) Field of Classification Search
CPC ... H04W 72/27; H04W 72/541; H04W 72/29; H04W 72/046; H04W 92/20;
(Continued)

(56) References Cited

U.S. PATENT DOCUMENTS

| 9,420,606 B2 * | 8/2016 | Bhushan | ............. H04W 72/541 |
| 2014/0044023 A1 * | 2/2014 | Kazmi | .................. H04W 28/18 |
| | | | 370/278 |

(Continued)

FOREIGN PATENT DOCUMENTS

| GB | 2577529 A | 4/2020 |
| WO | 2019013882 A1 | 1/2019 |

OTHER PUBLICATIONS

Ericsson: "IAB Resource Configuration and Assignment", 3GPP TSG-RAN WG1 Meeting #96, 3GPP Draft; R1-1903226, 3rd Generation Partnership Project (3GPP), vol. RAN WG1, No. Athens, Greece; Mar. 25, 2019-Mar. 1, 2019, Feb. 18, 2019 (Feb. 18, 2019), 6 Pages, XP051600921, Retrieved from the Internet: URL: http://www.3gpp.org/ftp/tsg%5Fran/WG1%5FRL1/TSGR1%5F96/Docs/R1%2D1903226%2Ezip [retrieved on Feb. 18, 2019] Section 2.2, Section 2.2.1-Section 2.2.2, Section 2.2.3.2.

(Continued)

*Primary Examiner* — Khanh C Tran
(74) *Attorney, Agent, or Firm* — Procopio, Cory, Hargreaves & Savitch LLP

(57) ABSTRACT

A configuration for local coordination between the child node and parent node to enable SDM communication between the parent and child node, without input or interaction from the CU. The apparatus receives, from a CU, an indication including an allocation of resources. The apparatus determines a type of communication with a second node based on the allocation of resources. The apparatus communicates with the second node based on the determined type of communication and utilizing the allocated (Continued)

resources. The apparatus coordinates with a parent node to utilize the allocated resources in an SDM operation between the child node and the parent node.

80 Claims, 15 Drawing Sheets

Related U.S. Application Data

(60) Provisional application No. 62/836,563, filed on Apr. 19, 2019.

(51) Int. Cl.
*H04W 72/044* (2023.01)
*H04W 72/29* (2023.01)
*H04W 88/08* (2009.01)
*H04W 92/20* (2009.01)

(52) U.S. Cl.
CPC .......... *H04W 72/29* (2023.01); *H04W 88/085* (2013.01); *H04W 92/20* (2013.01)

(58) Field of Classification Search
CPC ..... H04W 28/16; H04W 72/04; H04W 36/30; H04W 92/12; H04W 92/10; H04W 88/08; H04W 72/542; H04B 7/0697; H04B 17/24; H04B 7/0617; H04B 7/024
See application file for complete search history.

(56) References Cited

U.S. PATENT DOCUMENTS

| | | | | |
|---|---|---|---|---|
| 2015/0382375 | A1* | 12/2015 | Bhushan | H04W 72/23 370/252 |
| 2017/0054544 | A1* | 2/2017 | Kazmi | H04L 5/14 |
| 2017/0195103 | A1* | 7/2017 | Guan | H04L 1/1854 |
| 2019/0014500 | A1 | 1/2019 | Abedini et al. | |
| 2019/0014533 | A1 | 1/2019 | Abedini et al. | |
| 2019/0021108 | A1 | 1/2019 | Hampel et al. | |
| 2019/0349079 | A1 | 11/2019 | Novlan et al. | |
| 2020/0052775 | A1* | 2/2020 | Nam | H04B 17/336 |
| 2020/0107362 | A1 | 4/2020 | Qi et al. | |
| 2020/0313837 | A1* | 10/2020 | Vejlgaard | H04W 72/541 |
| 2020/0337047 | A1 | 10/2020 | Abedini et al. | |
| 2020/0337057 | A1 | 10/2020 | Abedini et al. | |
| 2021/0160861 | A1 | 5/2021 | You et al. | |
| 2021/0250941 | A1 | 8/2021 | Tiirola et al. | |
| 2021/0281386 | A1* | 9/2021 | Xia | H04W 72/21 |
| 2021/0345322 | A1* | 11/2021 | Tiirola | H04W 72/1263 |
| 2022/0053478 | A1 | 2/2022 | Xu et al. | |

OTHER PUBLICATIONS

Ericsson: "Timing CLI and Power Control in Enhanced IAB", 3GPP TSG-RAN WG1 Meeting #103-e, R1-2009302, e-Meeting, Oct. 26-Nov. 13, 2020, 11 Pages.

International Preliminary Report on Patentability—PCT/US2020/025787, The International Bureau of WIPO—Geneva, Switzerland, dated Oct. 28, 2021.

International Search Report and Written Opinion—PCT/US2020/025787—ISA/EPO—dated Jul. 22, 2020.

Moderator (AT&T): "Summary of [103-e-NR-eiAB-01]", 3GPP TSG RAN WG1 #103-e, R1-200xxxx, e-Meeting, Oct. 26-Nov. 13, 2020 Agenda Item: 8.10.1, pp. 1-32.

QUALCOMM Incorporated: "IAB Resource Management Framework", 3GPP Draft, 3GPP TSG RAN WG1 Meeting AH1901, R1-1900881, IAB Resource Management Framework, 3GPP, vol. RAN WG1. No. Taipei, Taiwan; Jan. 21, 2019-Jan. 25, 2019, Jan. 20, 2019, XP051593727, Jan. 12, 2019, 8 Pages, Retrieved from Internet: URL: http://www.3gpp.org/ftp/Meetings%5F3GPP%5FSYNC/RAN1/Docs/R1%2D1900881%2Ezip [retrieved on Jan. 20, 2019], the whole document.

Ericsson: "IAB Resource Configuration and Coordination", 3GPP TSG-RAN WG1 Meeting #96bis, R1-1904834, Xi'an, China, Apr. 8-12, 2019, pp. 1-7.

Taiwan Search Report—TW109110787—TIPO—May 4, 2023.

\* cited by examiner

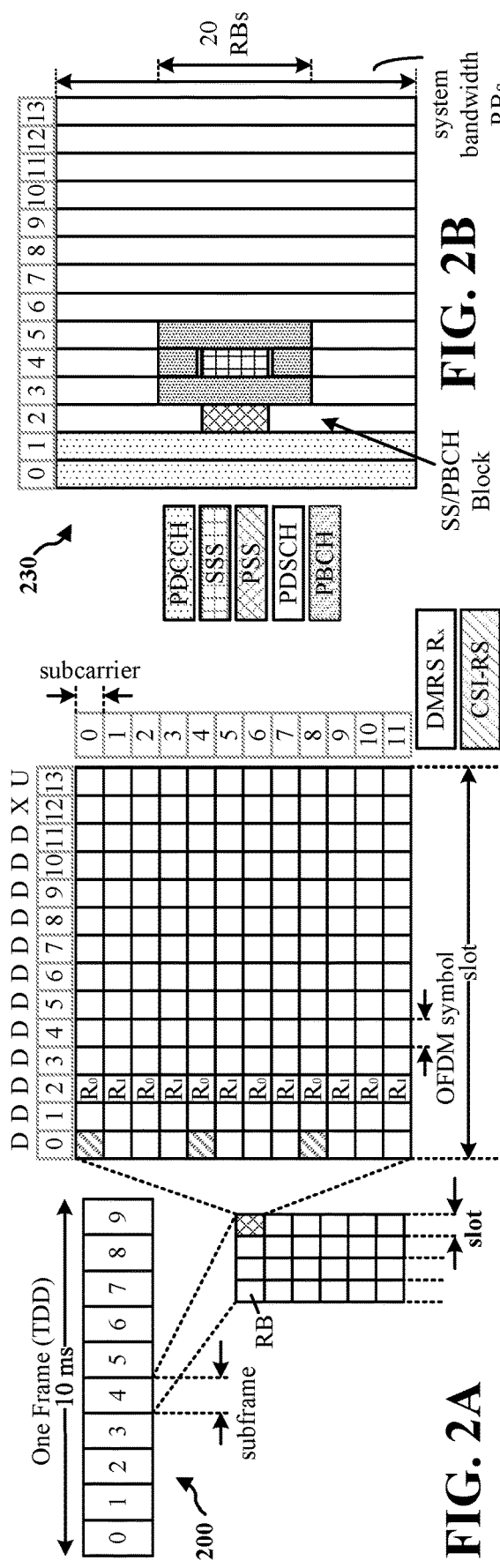
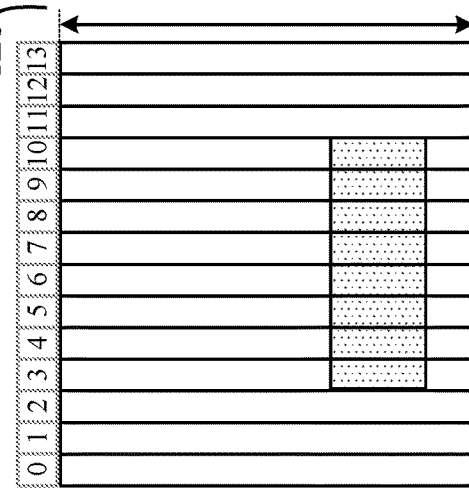
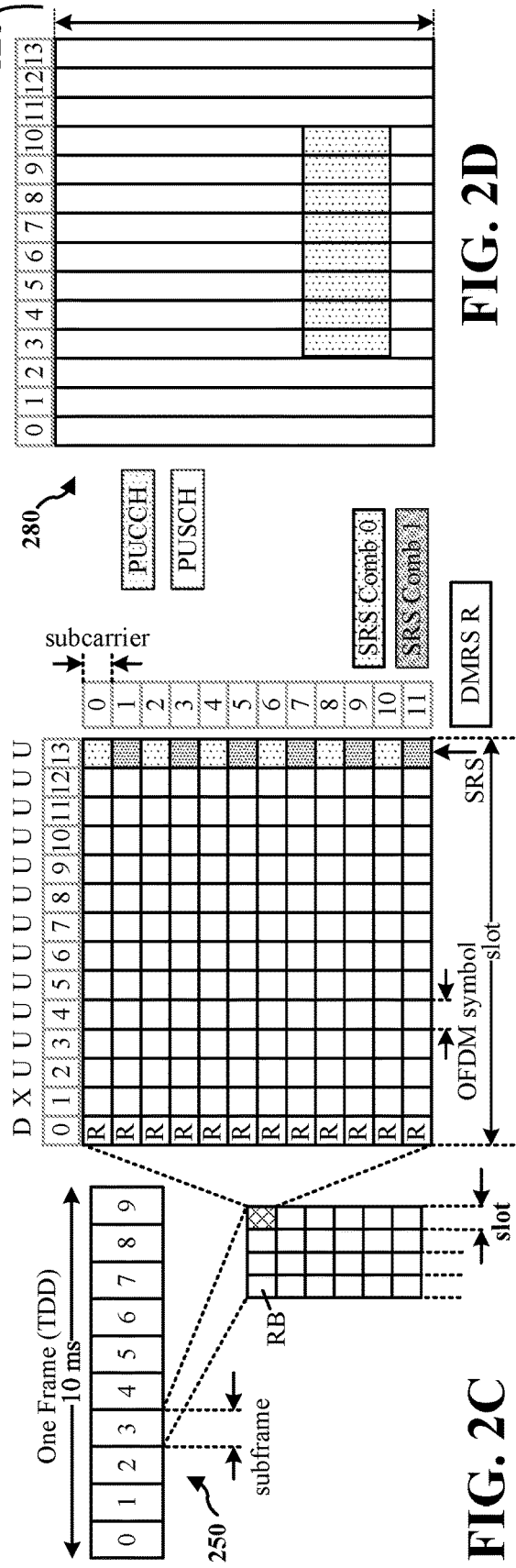
FIG. 2A  FIG. 2B  FIG. 2C  FIG. 2D

LOCAL COORDINATION TO SUPPORT SPATIAL DIVISION MULTIPLEX OPERATION IN INTEGRATED ACCESS AND BACKHAUL NETWORKS

CROSS REFERENCE TO RELATED APPLICATION(S)

This application is a Continuation of U.S. patent application Ser. No. 16/833,281, entitled "LOCAL COORDINATION TO SUPPORT SPATIAL DIVISION MULTIPLEX OPERATION IN INTEGRATED ACCESS AND BACKHAUL NETWORKS" and filed on Mar. 27, 2020, which claims the benefit of U.S. Provisional Application Ser. No. 62/836,563, entitled "Local Coordination to Support Spatial Division Multiplex Operation in Integrated Access and Backhaul Networks" and filed on Apr. 19, 2019, which are expressly incorporated by reference herein in their entirety.

BACKGROUND

Technical Field

The present disclosure relates generally to communication systems, and more particularly, to coordinate spatial division multiplex (SDM) operation in integrated access and backhaul (IAB) networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, for NR communications technology and beyond, flexibility in the use of the time/frequency resources for an IAB node is limited. Thus, improvement in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To provide for more efficient and enhanced communications, the present disclosure allows a parent node and child node to perform local coordination without any input or interaction from a CU, in order to enable SDM communication between the parent and child nodes. Local coordination between the child and parent nodes may reduce signaling overhead while enabling SDM communication between the parent and child nodes. The interface or links between the parent and child nodes may be dynamic and may change rapidly, such that allowing the parent and child to coordinate communication with each other may allow the parent and child nodes to be more efficient, than doing central semi-static coordination.

In an aspect of the disclosure, a method, a computer-readable medium, and an apparatus are provided. The apparatus receives, from a central unit (CU), an indication including an allocation of resources. The apparatus determines a type of communication with a second node based on the allocation of resources. The apparatus communicates with the second node based on the determined type of communication and utilizes the allocated resources. The apparatus coordinates with a parent node to utilize the allocated resources in a spatial divisional multiplex (SDM) operation between the child node and the parent node.

In another aspect of the disclosure, a method, a computer-readable medium, and an apparatus are provided. The apparatus determines a set of resources for communication with a child node. The apparatus determines capabilities of a child node, wherein the capabilities include SDM or frequency division multiplex (FDM). The apparatus communicates with the child node based on the capabilities and set of resources.

In another aspect of the disclosure, a method, a computer-readable medium, and an apparatus are provided. The apparatus determines a set of resources for communication with a child node. The apparatus coordinates with the child node to utilize the allocated resources in an SDM operation between the child node and the parent node. The apparatus communicates with the child node based on the capabilities and set of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
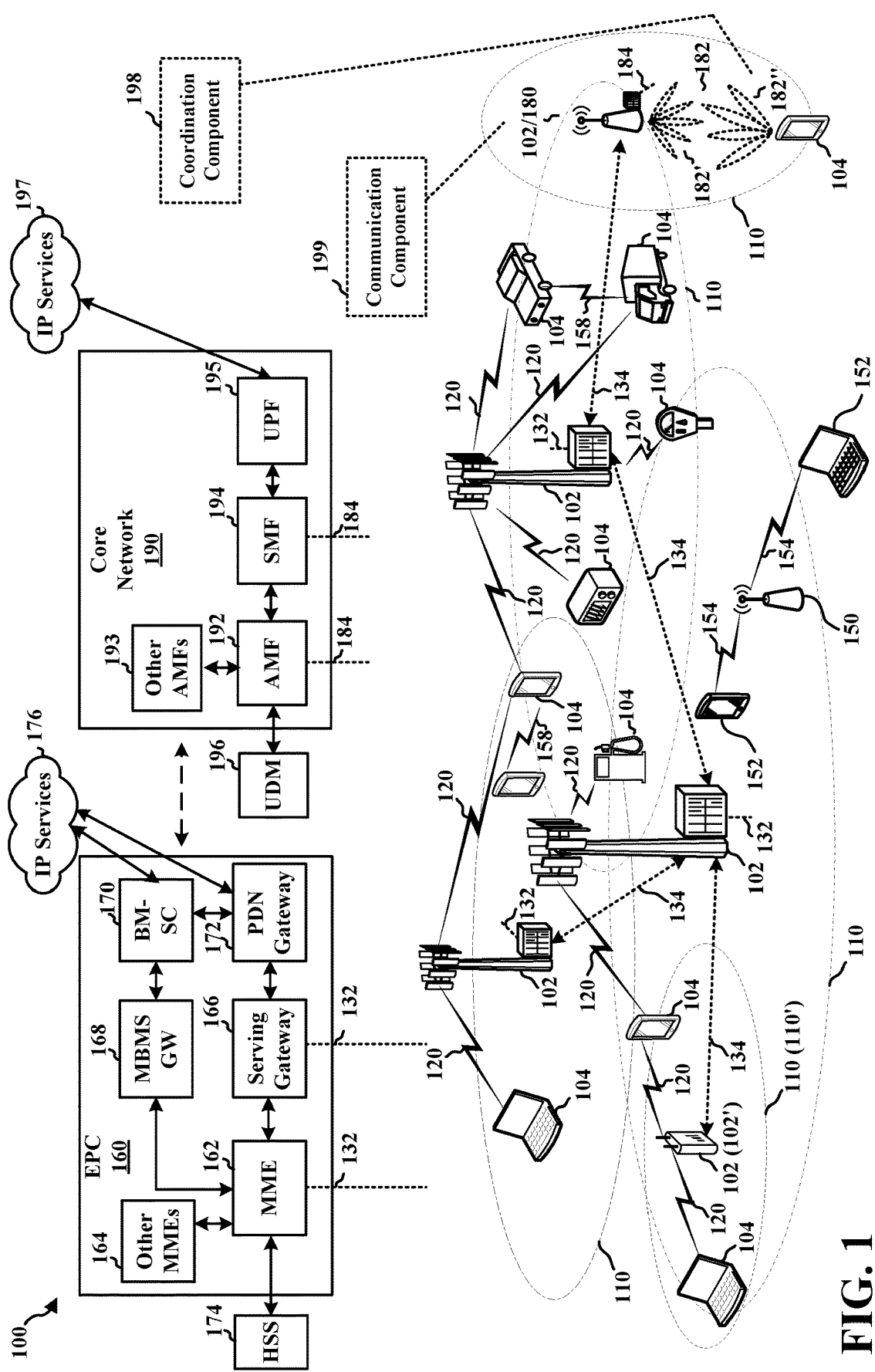
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 and UEs 104 may act as nodes in a multi-hop IAB network. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the IAB child node may be configured to coordinate with a parent node in order to operate in SDM operation between the child and parent node. For example, the child node (e.g., UE 104 of FIG. 1) includes a coordination component 198 configured to coordinate with a parent node to utilize allocated resources in SDM operation. The child node may receive, from a CU, an indication including an allocation of resources. The child node may determine a type of communication with a second node (e.g., parent or child node) based on the allocation of resources. The child node may communicate with the second node based on the determined type of communication and utilize the allocated resources. The child node may coordinate with a parent node to utilize the allocated resources in the SDM operation between the child node and the parent node.

Referring again to FIG. 1, in certain aspects, the IAB parent node may be configured to communicate with a child node based on the capabilities of the child node. For example, the parent node (e.g., base station 180) includes a communication component 199 configured to coordinate with a child node to utilize allocated resources in SDM operation. The parent node may determine a set of resources for communication with the child node. The parent node may determine capabilities of the child node, wherein the capabilities include SDM or frequency division multiplex (FDM). The parent node may communicate with the child node based on the capabilities and set of resources.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
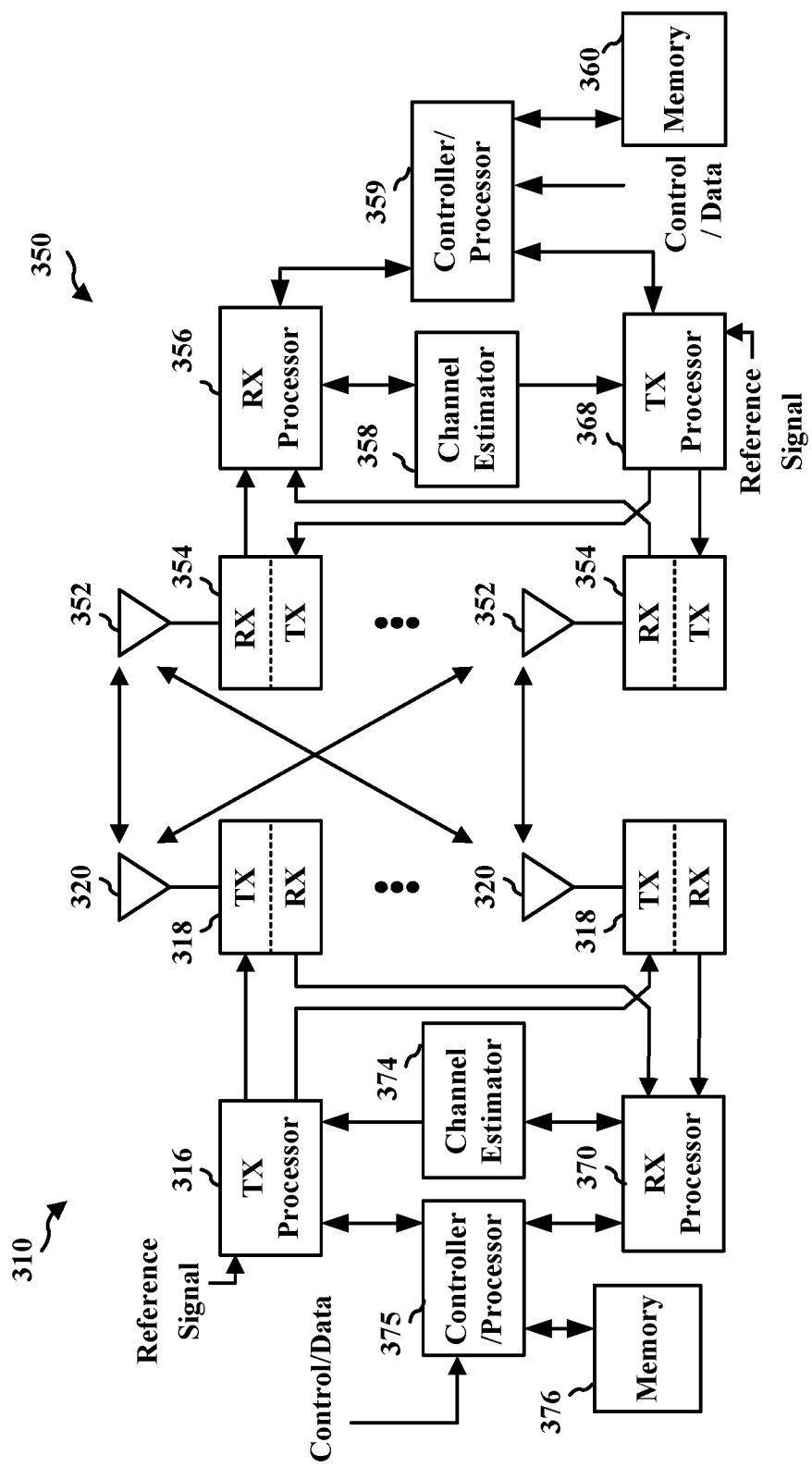
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
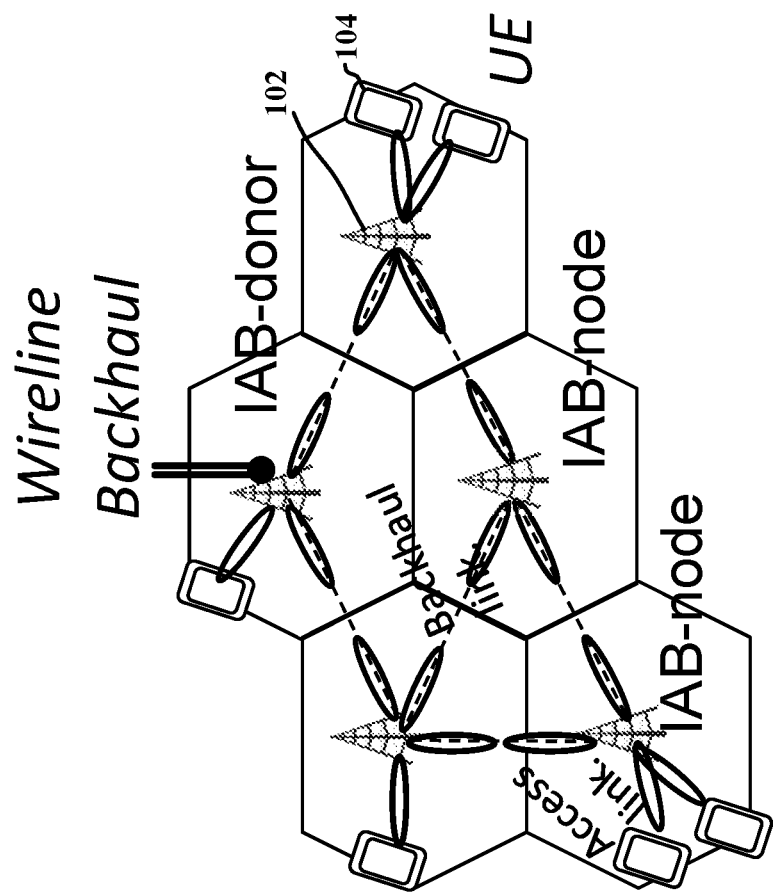
FIG. 4 is an example of an integrated access and backhaul (IAB) network that may be part of the wireless communications system and access network of FIG. 1.

FIG. 4 shows an example architecture of an IAB network 400. The IAB network may comprise at least one IAB-donor, at least one IAB-node (e.g., base stations 102/180) wirelessly connected to the IAB-donor, and at least one UE (e.g., UE 104) wirelessly connected to the IAB-node. IAB-nodes may wirelessly connect to other IAB-nodes to form a network of parent nodes and child nodes.

With reference to FIG. 4, one or more of the base stations (e.g., 102) and/or UEs (e.g., 104) of FIG. 1 may be part of an IAB network, for example, the IAB network 400. 5G NR technologies, such as mmW, may be used to support access networks which include connections (e.g., access link 402) between access nodes (AN), e.g., base stations 102, and UEs 104 and backhaul networks, which include connections between ANs/base stations 102. A backhaul network may include one or more IAB-donors having an AN with wireline connection to a core network and one more IAB-nodes. The IAB node may include an AN having a wireless backhaul (e.g., backhaul link 404). The AN of the IAB node may relay traffic from/to an anchor node through one or multiple hops. An IAB-donor may be a node that is at the root of a topology of an architecture (or the highest level of a hierarchy) adopted by the IAB network 400. The IAB network 400 may share the resources between an access network and a backhaul network. In the IAB network 400 of this disclosure, reuse of framework for an access network is desired as much as possible.

In some examples, the IAB network 400 may include a central entity (as referred to as a central unit (CU)) having a placement within the IAB network that is dependent on the architecture adopted by the IAB network. For example, in one aspect the central entity may be a part of the IAB-donor and each IAB node may include a distributed unit (DU). In another example, each IAB-node of the IAB network may comprise both a central entity and a DU. The CU may reside at the IAB-donor. The IAB-donor is at the head of the IAB topology, such that it is the node that has a wired or fiber connection (e.g., wireline backhaul) and is providing the wireless connection to the other IAB nodes.

Figure 5:
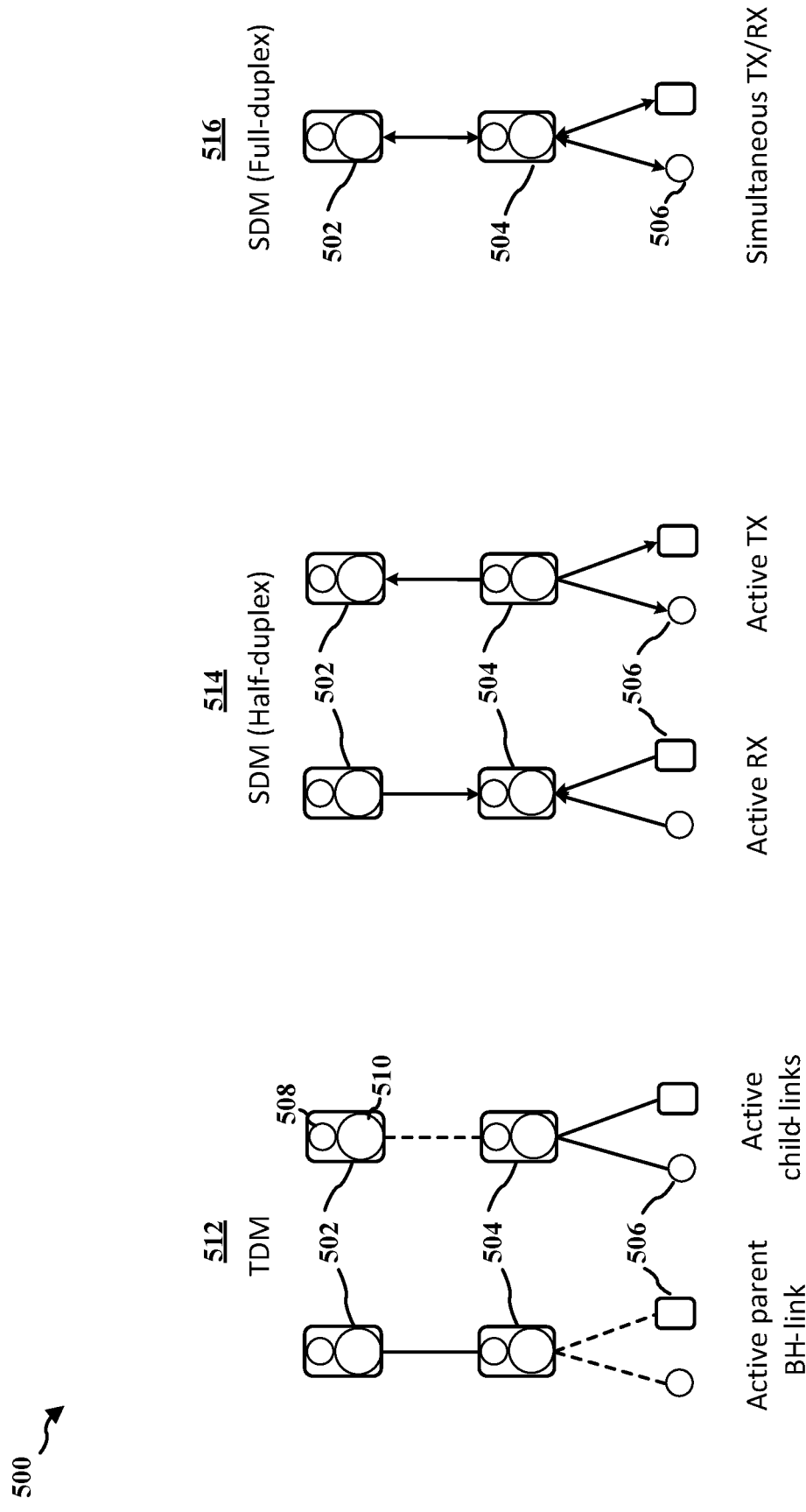
FIG. 5 is a diagram of multiplexing schemes in accordance with certain aspects of the disclosure.

FIG. 5 shows multiple examples of communication schemes 500 for parent and child IAB nodes. The parent nodes 502 and child nodes 504 each include two logical units, a mobile termination unit (MT) 508 and a distributed unit (DU) 510. The DU 510 of the parent node is logically connected to the MT 508 of the child node. IAB nodes are constrained to operate in half duplex. Meaning that nodes cannot simultaneously transmit and receive at the same time and at the same frequency. For example, a child node is not able to transmit to a parent node on a backhaul link and receive something from its child (e.g., grandchild node) on one of its child links. Otherwise the child node would be transmitting and receiving at the same time, which would result in a conflict. In order to resolve the conflict, a proposed solution was to operate the parent and child links in time division multiplex (TDM).

In TDM, the time resources can be orthogonalized and used for communication over the parent backhaul link and the child link. With reference to TDM 512 of FIG. 5, the parent node 502 link may be active (e.g., shown as solid line in FIG. 5) during a first set of time resources (or first set of slots), and then the child node 504 links may be active (e.g., also shown as solid lines in FIG. 5) during another set of non-overlapping time resources. As such, communications over parent node 502 links and child node 504 links are orthogonal and there will not be any half duplex issues.

In another example, as shown in spatial division multiplex (SDM) 514 of FIG. 5, communication in the frequency range FR2 is typically beam formed, such that the child may have a multiple antenna array and can create multiple beams at the same time using the multiple antennas. In such instances, the child node 504 may use one beam to receive from a parent node (e.g., 502), and use another beam that is spatially separated, spatially orthogonal to receive from another node (e.g., grandchild nodes 506). Dividing the spatial resources or beam direction to multiplex multiple communications is the essence of SDM 514. With SDM half-duplex, the node (e.g., child node 504) is not able to transmit and receive at the same time, but is able to receive multiple beams. As such, in the first set of time resources (or set of slots), the node (e.g., child node 504) can operate in receive mode in which it can receive from multiple links using multiple beams, and in a separate time unit or separate set of time slots, the node may operate in transmit mode, such that it can use different beams or spatial resources to transmit to the parent node 502 and/or to some of the children nodes (e.g., 506).

SDM full-duplex 516 expands upon SDM half-duplex 514 and may create an IAB node with additional capabilities, such as full duplex capabilities. A node having full-duplex capability means that the node may transmit and receive at the same time, using either a single link or multiple links. A full-duplex node may be able to transmit and receive on all of its links simultaneously using multiple beams or a single beam. Progressing from TDM to SDM half-duplex and SDM full-duplex, may result in enhanced performance as well as increased spectral efficiency and capacity. Thus, there exists a need to further improve communication between IAB nodes in IAB networks.

Figure 6:
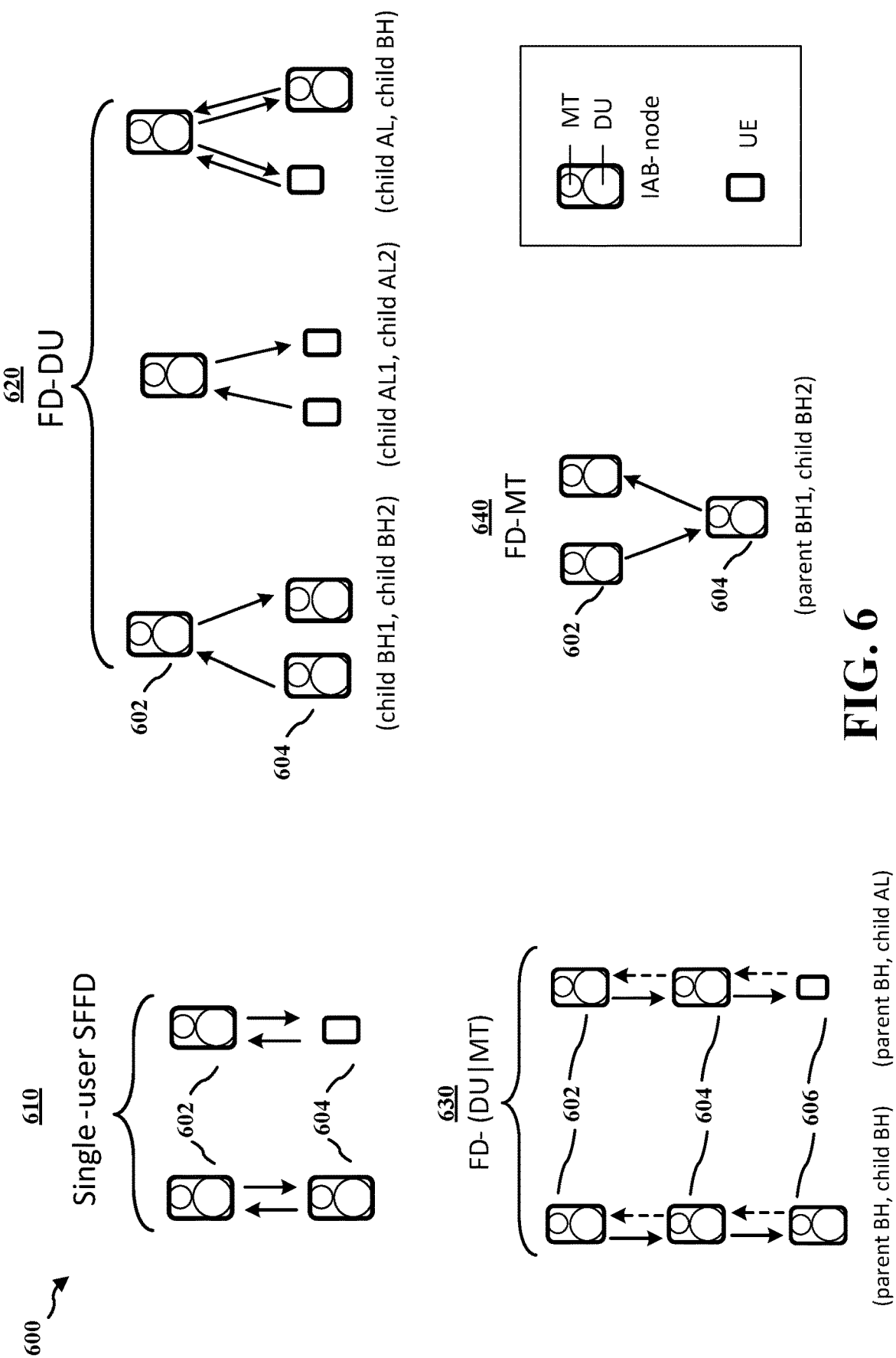
FIG. 6 is a diagram of full duplex schemes in accordance with certain aspects of the disclosure.

FIG. 6 shows a diagram 600 with multiple examples of full duplex schemes. In Single-user single frequency full duplex 610 (SFFD), the same frequency is utilized when transmitting and receiving at the same time. There is no orthogonality in the frequency. SFFD 610 may be based on the perspective of one IAB node, such that a single IAB node (e.g., parent node 602) communicates with another single IAB node (e.g., child node 604), which results in bi-directional communication. The single IAB node is transmitting and receiving with the other node. The other node may be an IAB node or may be a UE.

In FD-(DU|MT) 630 allows for full duplex communication between the MT of an IAB node and the DU of an IAB node. As such, there is full duplex communication over the parent backhaul link and the child backhaul link. In the example of FD-(DU|MT) 630, the MT of the child node 604 can be receiving from the parent node 602 or parent link, and the co-located DU of the child node 604 can be transmitting on the child link to a child node 606. Thus, the two logical entities, the MT and DU, are active such that one is receiving while the other is transmitting.

There may be some instances in which the DU part of the IAB node is operating in full duplex, such that the MT is not engaged. For example, in FD-DU 620, the DU of node 602 is communicating with two children nodes 604, 604 at the same time. In such instance, the DU of node 602 is receiving from one child node 604 and is transmitting to another child. The child node 604 may be an IAB node, a UE, or a combination thereof.

The last full duplex scenario is FD-MT 640, where the DU part is idle and not active, and the MT is actively communicating in full duplex manner with two parent nodes (e.g., 602) such that the MT is receiving from one parent and is transmitting to another parent.

Figure 7:
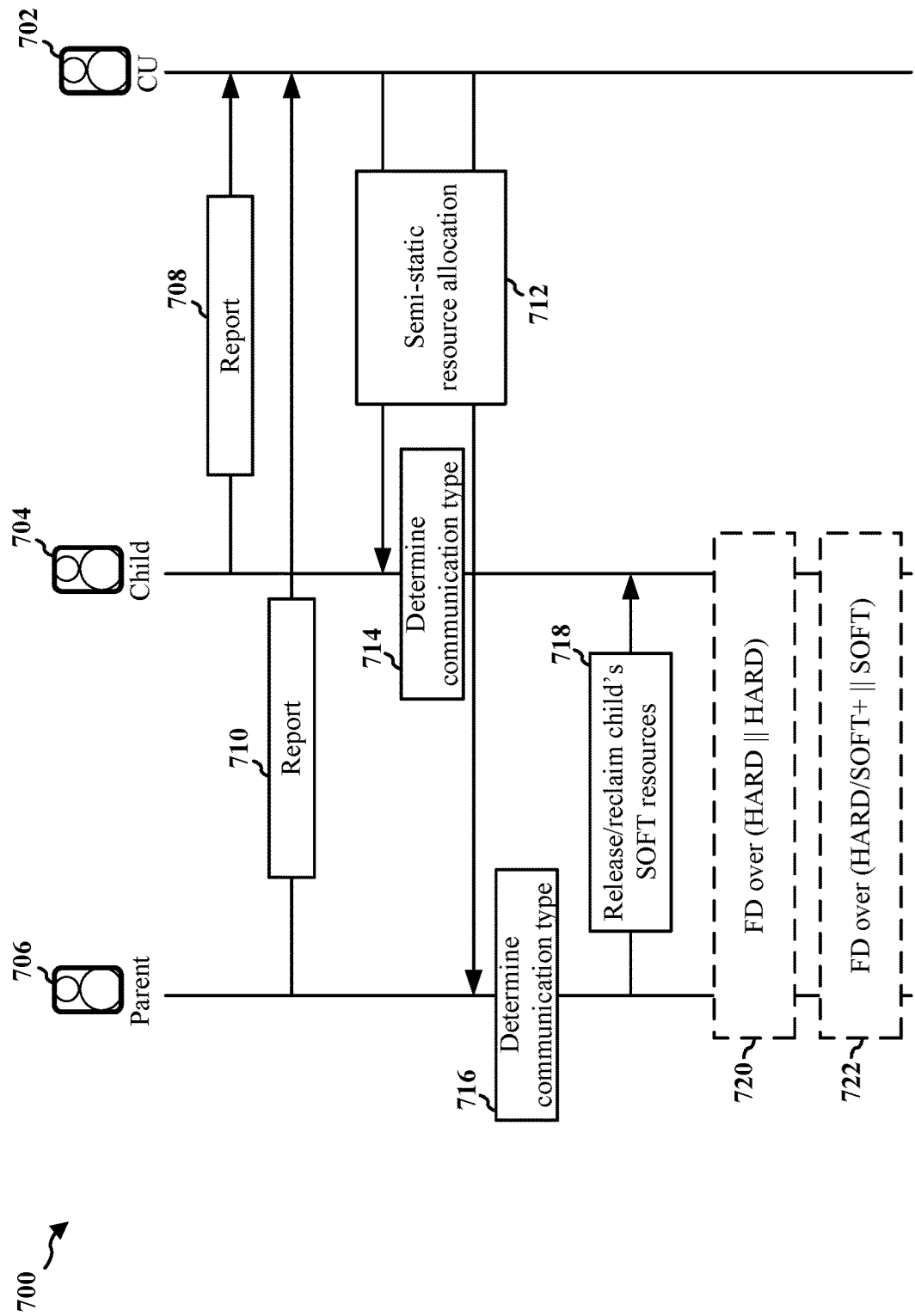
FIG. 7 is a call flow diagram of signaling between a parent node, child node, and a CU in accordance with certain aspects of the disclosure.

FIG. 7 is a call flow diagram 700 of signaling between the CU 702, child node 704, and parent node 706. In the diagram 700, the child node 704 and parent node 706 have a logical connection to the CU 702, and may not have an immediate connection. In some aspects, the connection with the CU 702 is over the air and may include multiple hops. The CU 702 may control the allocation of resources for the IAB network. The parent and child may each provide a report 710, 708, respectively, at some point in time to the CU 702. The report 708, 710 may include information with regards to the functionality or current status of the respective node. In some aspects, the reports 708, 710, may include beam or channel quality measurements that the nodes themselves have performed or performed by their children nodes. The report may include cross link interference (CLI) measurements taken by themselves or by their children. The report may include some radio resource management (RRM) measurements, for example, for discovering new neighbor cells. In some aspects, the node may perform the discovery and may share the results with the CU. The report may include information with regards to the traffic and/or load status. The information provided in the reports is reported to the CU and/or may be made available to the CU.

The CU may take the information contained in the reports into account when it generates or provides the semi-static resource allocation 712. Currently, the semi-static resource allocation is geared towards time division multiple access (TDMA) for accessing channels. As such, the CU 702 may provide each IAB node with a set of time resources, or the CU 702 may label the time resources with different labels. The CU 702 may label the time resources as HARD, SOFT, or NOT-AVAILABLE. In instances where the CU labels some of the time resources for an IAB node as NOT-AVAILABLE, such time resources may not be utilized by the node to communicate with its child nodes. The label of HARD may indicate that such resources may be available to such node to communicate with its own children with no conditions, such that the node can flexibly use the resources. The label of SOFT may indicate that such resources may be used or may become available for the use of an IAB node.

The availability of the resources may be determined by the parent node of the child. For example, if the CU 702 informs the child (e.g., 704) that a certain slot, for example, slot N is available but is labeled as SOFT, this means that the child may not use slot N when communicating with its children, unless the parent node, which has ownership/control of the resources, releases the resources. In some aspects, the parent node may be the primary owner of the resources, and may decide that it does not need the resources. As such, the parent node (e.g., 706) may elect to release 718 such unneeded resources to be used by the child node (e.g., 704). The availability of SOFT resources may be determined by the parent node, and through some local coordination between the parent and child node. In some aspects, the parent node may release at least some resources of the allocated resources for use by the child node. The release of the at least some resources may be unconditional or subject to conditions. In some aspects, the conditions may be imposed by the parent node.

The CU (e.g. 702) may also be configured to determine or enforce the transmission direction of the resources. For example, the CU 702 may indicate that the resources 712 are available, but only for downlink and cannot be used for UL. In some aspects, the CU may indicate that the resources may only be used for UL. The child node 704 and/or parent node 706, after receiving the resource allocation 712, may be configured to determine the capabilities or communication type available to it based on the allocated resources. For example, the CU 702 may put restrictions and/or limitations on the direction of communication that the parent and/or child node may utilize the allocated resources. In some aspects, the child node 704, at 714, may determine the communication type available to it, in response to the semi-static resource allocation. In some aspects, the parent node 706, at 716, may determine a set of resources for communication with the child node. To determine the set of resources, the parent node may receive an indication including the set of resources for communication with the child node. In some aspects, the parent node may determine the communication type available to it, in response to the semi-static resource allocation. In aspects when the CU labels the resource as Flexible, the IAB node may be configured to decide whatever it wants to transmit in the downlink, or schedule something on the uplink, the node may decide locally.

Soft resources of the child node may be controlled by the parent node. Some coordination and/or interaction signaling may occur between the parent and child to release some of the soft resources or to reclaim them (e.g., 718), if the parent needs the released resources. After that, each node has a full understanding of its limitations and allocated resources and can start using those resources for communication, either between parent and child (e.g., 720, 722) or child with its own children or parent with other children, etc.

Elements 720 and 722 of FIG. 7 are directed to local coordination between the parent node 706 and child node 704 to enable SDM communication in the absence of the CU 702. 720 is directed to enabling SDM full-duplex operation between the parent and child when the CU has labeled the resources as HARD∥HARD, while 722 is directed to enabling SDM full-duplex operation between the parent and child when the CU has labeled the resources as HARD/SOFT+∥SOFT. The labeling convention first identifies the labeling of the resources for the parent node, followed by the child node. Thus, the labeling of HARD∥HARD indicates that the resources for the parent node are labeled as HARD, and that the resources for the child node are labeled as HARD. In yet another example, the labeling of the resources as HARD/SOFT+∥SOFT, indicates that the resources for the parent node are either HARD or SOFT+ (explained below), and that the resources for the child node are labeled as SOFT. As discussed above, the labeling of the resources may determine which node controls the resources and which node may have to request resources from the other.

To provide for more efficient and enhanced communications, the present disclosure allows the parent node and child node to perform local coordination without any input or interaction from the CU, in order to enable SDM communication between the parent and child nodes. The parent node may coordinate with the child node to utilize the allocated resources in a SDM operation between the child node and the parent node. Local coordination between the child and parent nodes may reduce signaling overhead while enabling SDM communication between the parent and child nodes. The interface or links between the parent and child nodes may be dynamic and may change rapidly, such that allowing the parent and child to coordinate communication with each other may allow the parent and child nodes to be more efficient, than doing central semi-static coordination.

In some aspects, the child node may be configured to provide a feedback signal to the parent node, while performing local coordination, in order to provide resources to the parent such that the child may operate in SDM communication with the parent. In some aspects, the child node may be configured to provide a feedback signal to the parent node in order to request resources from the parent such that the child may operate in SDM communication with the parent. In some aspects, the parent node may receive the feedback signal from the child node prior to utilizing the allocated resources. In some aspects, the parent node may receive the feedback signal from the child node after utilizing the allocated resources. The feedback signal may include one or more capabilities or conditions of SDM communication of the child node. The feedback signal may include conditions on the manner in which the parent node is configured to utilize the allocated resources. The feedback signal may indicate whether the child node supports the configuration for communication provided in a schedule for the child node to communicate with the parent node.

Figure 8:
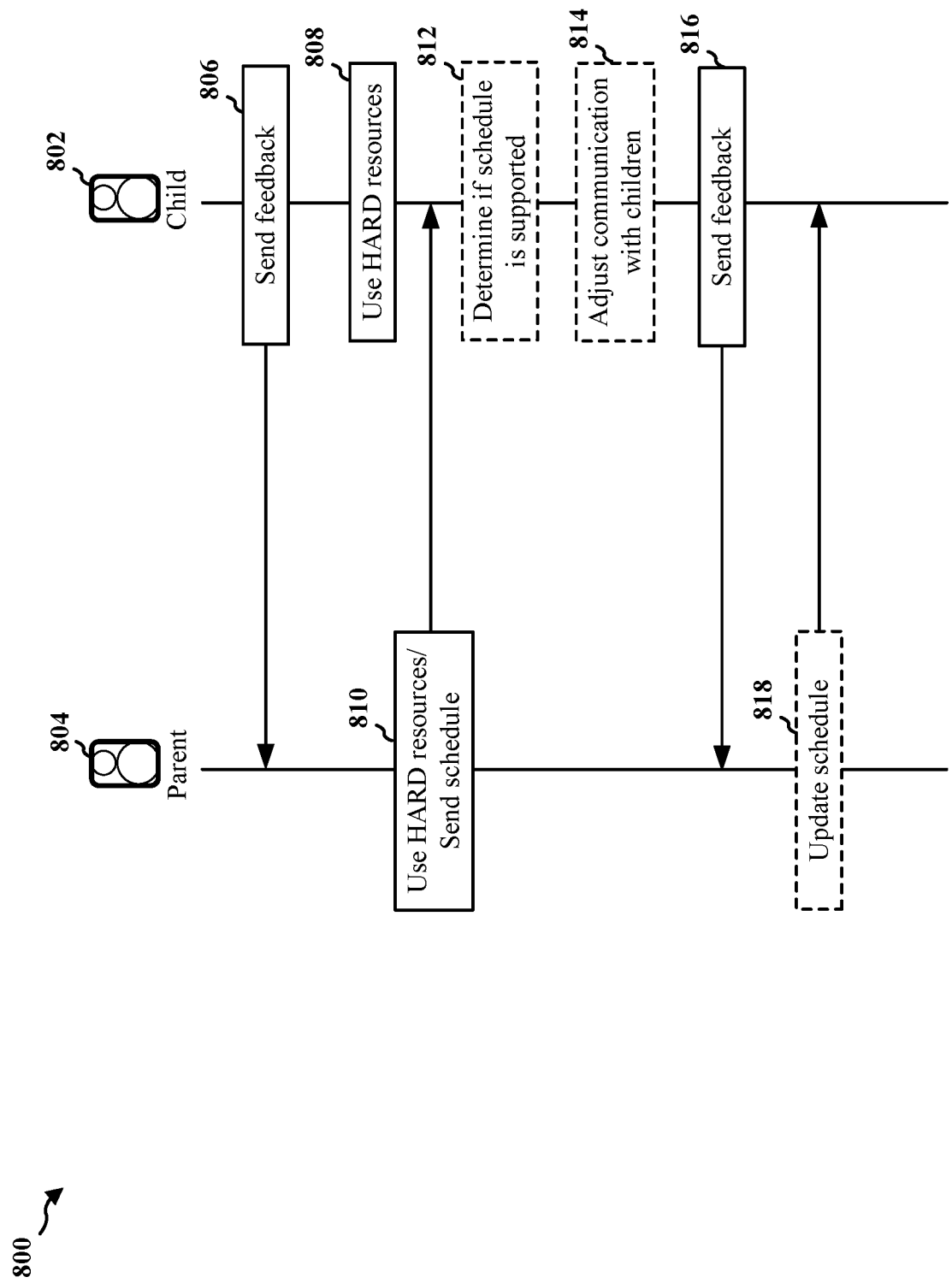
FIG. 8 is a call flow diagram of signaling between a parent node and a child node in accordance with certain aspects of the disclosure.

FIG. 8 is a call flow diagram 800 of signaling between a parent node 804 and a child node 802 in accordance with certain aspects of the disclosure. The call flow diagram 800 is a detailed view of the SDM full duplex over (HARD ∥ HARD) 720 of FIG. 7, such that the call flow diagram 800 may occur after the CU has allocated the resources to the child and parent. For example, in the aspect of FIG. 8, the CU has labeled the resources as (HARD∥HARD).

The labeling of HARD∥HARD for the resources means that the same set of resources have been allocated to the parent and child node and have been labeled as HARD by the CU. If a conflict were to arise between the resources, the conflict resolution results in granting priority to the DU of the child node communicating with its grandchildren. The DU can use the allocated HARD resources for communicating over its own child links without any consideration of the co-located MT's schedule for communication over the backhaul links. The MT part of the child node is configured to communicate with the parent node over the parent backhaul link and the DU part of the child node is configured to communicate over the child link. The DU part of the child may look at the resources and may determine that the resources have been given to the DU and are labeled as HARD. The co-located MT is scheduled by the parent, and if there is a conflict, priority may be granted to the DU so that the DU can use those resources and the MT may back off, such that priority is given to the child link from the child to the grandchildren compared to the backhaul link between the parent and the child node.

The child node (e.g., 802) may locally ignore the communication of the MT part to the parent, therefore, the parent cannot expect the child's MT to be available for communication over the HARD∥HARD resources. For example, the parent node may attempt to utilize the HARD resource 810, but the child node will ignore the communication of the MT of the parent. In some aspects, the parent node 804 may transmit a schedule 810 to the child node 802, in an attempt to obtain resources. The schedule may include a configuration for communication between the parent node and the child node. In some aspects, the child node may ignore the schedule 810 and the parent's attempt to obtain resources from the child. Since the child node may ignore the scheduler for the backhaul link. The parent node cannot expect the MT of child to be available. However, the parent may try to use the resources either unconditionally, or subject to some conditions set by the CU or the child. For example, if feedback signal 806 was sent at the beginning, the feedback could provide those conditions. In some aspects, the feedback signal may include one or more capabilities or conditions of SDM communications of the child node. In some aspects, the feedback signal may indicate whether the child node supports the configuration for communication provided in the schedule. In some aspects, the feedback signal may include conditions on the manner in which the parent node may be configured to utilize the resources allocated from the CU. In some aspects, the parent node may utilize the allocation of resources unconditionally or subject to conditions. The conditions may be imposed by the CU, the parent node, or by at least the child node. In some aspects, the feedback signal may include a schedule for the child node to communicate with the parent node. In some aspects, the parent node may receive a feedback signal indicating whether the child node supports the configuration for communication provided in the schedule by the parent node. In some aspects, the parent node may receive a feedback signal after utilizing the allocated resources. The feedback signal may include one or more capabilities or conditions of SDM communication of the child node. Now the parent node knows that it does not need to completely yield, but it can still use the resources but subject to some limitations.

At 808, the DU of the child has high priority if there is a conflict, and ignores the MT's schedule. The child node DU can use the allocated HARD resources unconditionally. In some aspects, the use of the HARD resources, from the child's POV, may be conditional, subject to some conditions set by the CU. The CU may provide some conditions to use the resources. The usage of the resources may be subject to those conditions, or usage of the resources may be subject to some conditions that the child node itself came up with. This means that in order to be able to have full duplex with the parent and child, it may limit use of the HARD resources to only some subset of the beams or some channels or some link budget. So, the child may encode the constraint so it can enable multiplexing the communication with the parent backhaul link and child link. These self-imposed conditions may be actually indicated in the feedback, as discussed above.

In some aspects, the child node does not ignore the schedule 810 from the parent node 804. In such aspects, the child node 802 receives the schedule 810 request. The child node 802 and may determine 812 if the schedule including a configuration for communication between the parent node and child node sent from the parent is supported by the child. When the configuration for communication provided in the schedule is supported by the child node, the child node may adjust communication 814 with its children. The child node may then transmit a feedback signal 816 to the parent node in response to receipt of the schedule from the parent node. The feedback signal 816 indicating whether the child node supports the configuration for communication provided in the schedule.

The parent node 804, upon receipt of the feedback signal 816, may determine whether communication of the child node is supported by the parent node. In instances when the feedback signal indicates that the child node supports the configuration for communication provided in the schedule, the parent node 804 may transmit an updated schedule 818 to the child node 802. The updated schedule 818 may adjust and/or modify the configuration of the schedule in view of the received feedback signal from the child node. The child node and parent node transmitting and receiving the feedback signal 816 and updated schedule 818 is local coordination between the child and parent that enable SDM operation between the parent and child. In some aspects, the parent node may transmit the updated schedule to the child node when SDM communication of the child node may be supported by the parent node. In some aspects, an updated schedule may be transmitted to the child node by the parent node when the feedback signal from the child node indicates that the child node may be configured to support the configuration provided in the schedule by the parent node.

In some aspects, the parent may have some knowledge about the resource configuration of the child node's DU. For example, the CU may have provided extra information to the parent about the same set of resources that were allocated to the child, such that the parent knows the configuration of the child. Therefore, the parent may decide to yield at 810, because there is no expectation of availability. If the parent does not yield it may try to schedule 810 a communication with the child, but it is possible that the schedule 810 will not be successful when the child has a half duplex constraint. In some aspects, the parent may be opportunistic and try to communicate with child's MT, but the parent should not have any expectations of communicating.

In some aspects, the parent may not know about the resource configuration of the child. The parent may look at the allocated resources and determine that some resources are labeled as HARD but does not know whether the resources are available for the child. In such case, the parent cannot assume anything about the child resources. As such, the parent may try to blindly communicate with the child MT within the parent's allocated resources. But if the same set of resources were given as HARD, to the child, then there is a chance that the communication will not be successful because there will be a conflict, and the conflict resolution rule indicates that priority will be given to the child link over the backhaul parent link.

In some aspects, the child node 802 may provide a feedback signal 806 prior to the child utilizing its allocated resources (e.g., 808). The feedback signal 806 may be similar to feedback signal 816. The feedback signal 806/816 may include the child's SDM full-duplex/half-duplex capability and/or it conditions. For example, the feedback signal may include conditions with regard to the child's ability or requirement for SDM operation, such as but not limited to which beams or links may support SDM in half duplex or full duplex, as well as maximum transmit/receive power. The feedback signal 806/816 may further include whether or not a subset of resources (originally allocated as HARD to the child) may be reused by the parent over the parent-child link, unconditionally or subject to conditions. The feedback signal 806/816 may suggest a schedule configuration/condition directed to MCS, transmit power, transmit/receive beam, frequency domain resources, RS resource/configuration, or timing reference.

The contents of the feedback 806/816 may be just what the child would provide to the CU in the report (like in previous application about its capabilities), and could be part of the local feedback, local report to the parent about the child's SDM capability and its conditions. Also, whether or not some subset of the resources can be reused by the parent, basically giving indication to the parent that it does not need to yield, because the child has this capability. If parent doesn't need to yield, the feedback signal may also include whether the parent node can use it unconditionally or subject to some conditions. Some examples of conditions suggest a schedule configuration/condition (e.g. MCS, TX power [backoff], TX/RX beam, frequency domain resources, RS resource/configuration, timing reference.

At least one advantage to the disclosure is that the interface between the parent and child nodes is expanding by adding more signaling, such that the parent and child may perform local coordination and enable SDM operation and enhance efficient operation. At least another advantage is that the parent and child nodes may locally decide to change their schedule or not based on information provided between the child and parent nodes.

Figure 9:
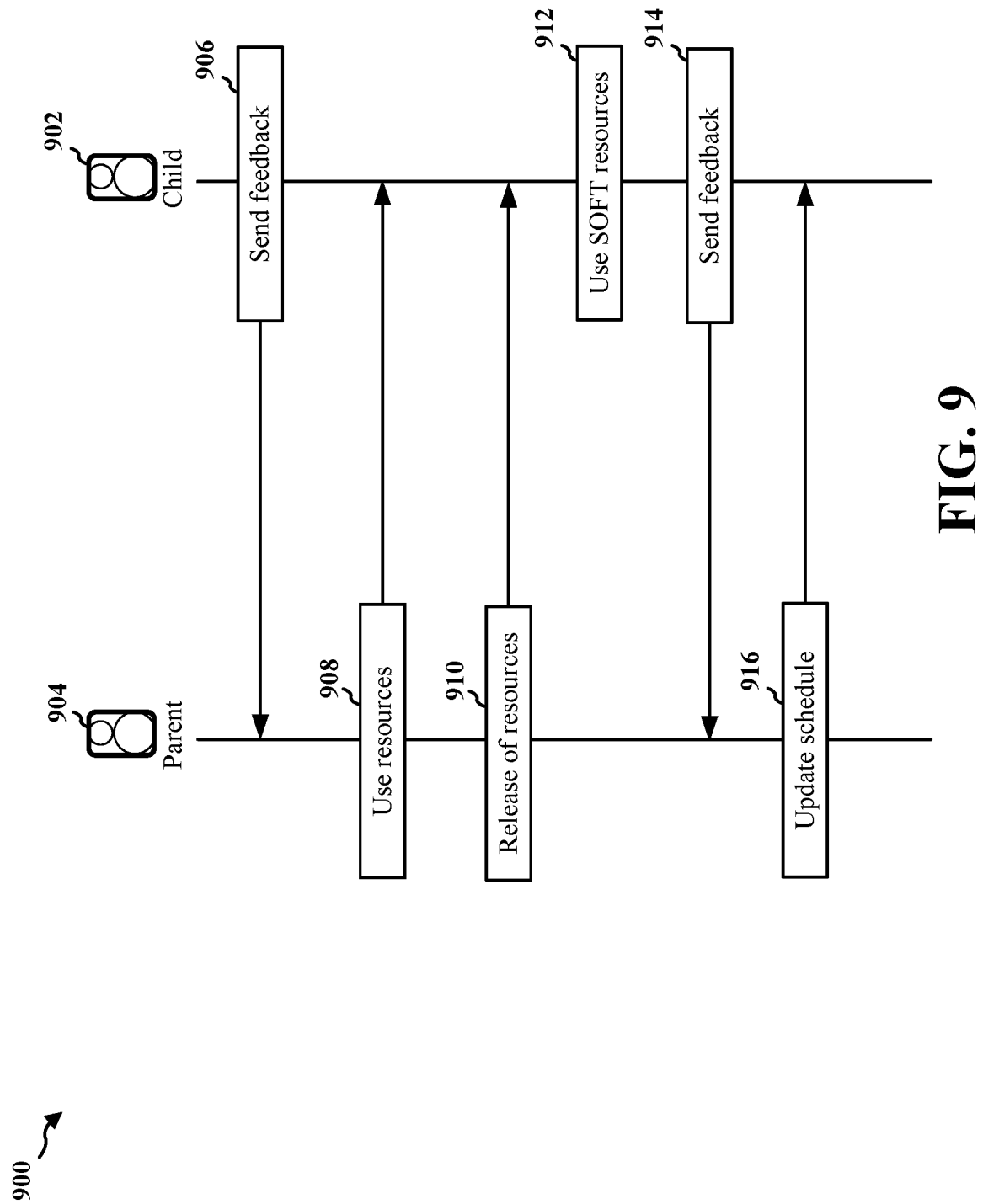
FIG. 9 is a call flow diagram of signaling between a parent node and a child node in accordance with certain aspects of the disclosure.

FIG. 9 is a call flow diagram 900 of signaling between a parent node 904 and a child node 902 in accordance with certain aspects of the disclosure. The call flow diagram 900 is a detailed view of the SDM full duplex over (HARD/SOFT+∥SOFT) 722 of FIG. 7, such that the call flow diagram 900 may occur after the CU has allocated the resources to the child and parent.

If the child node wants to have communications over its SOFT resources, this means that its resources have been labeled as SOFT by the CU, and that the same set of resources are available or may became available for the parent. This means that the resources were labeled as HARD for parent or were labeled as SOFT and the resources became available thru the grandparent (SOFT+). As such, the resources were default soft, but at some time it became available. Thus, from the child's perspective, there are some resources that are labeled as SOFT.

In SOFT, the parent node has the priority, so the parent node may use these resources unconditionally, and if it wants and does not need the resources, the parent can release the resources to the child, or reclaim them later on if the parent needs the resources. However, if the parent releases the resources, the parent is not supposed to use them, because the parent is temporarily giving up ownership to the child. The child node may use the soft resources only if it has received an indication that they are available to the child. By default, the child cannot use the SOFT resources.

The parent node by default has priority to use resources and may use them unconditionally or may use them subject to some conditions set by the CU or by the parent itself, in a similar manner as discussed above for diagram 800. The conditions may be suggested by the child, in instances where the child sent the feedback signal 906 prior to the parent using the resources at 908. In HARD∥HARD resources, the child node has the priority. However, in SOFT resources, the parent has the priority. The parent node may get some suggestions from the child, via feedback signal 906, that may impose some constraints and/or conditions on the parent's use of it resources, but the parent may not adhere to constraints and/or conditions because the parent has priority.

In some aspects, the parent may release 910 the resources and the release may be unconditional or it can be conditional subject to some condition/constraint. In some aspects, the conditions may be imposed by the parent node. So, in this case, although the parent is releasing the resources, if enough information is available, such as but not limited to feedback signals 906 and/or 914, the parent may still use those resources. Upon release 910 of the resources, the child node 902 may use the SOFT resources 912 if released by the parent unconditionally or subject to some conditions imposed by the parent.

In some aspects, the child node may provide feedback at the beginning (e.g., 906 before the parent uses the resources 908) or may provide feedback after the child has used the SOFT resources 912. The feedback signal 906, 914 may include a report of the child's capabilities and conditions. The feedback signal 906, 914 may request a schedule so that the child may multiplex communication with the parent and its own children. The parent node may respond by transmitting an updated schedule 916 to the child. The child sending feedback signal 914 and the parent providing an update schedule 916 may comprise the local coordination that allows SDM operation between the parent and child nodes. The feedback signal 906, 914 may include the child's SFFD capability and its conditions. The feedback signal 906, 914 may request a schedule configuration/condition e.g., MCS, transmit power, transmit/receive beam, frequency domain resources, RS resource/configuration, timing reference. In some aspects, the parent node may transmit the updated schedule to the child node when SDM communication of the child node may be supported by the parent node. In some aspects, an updated schedule may be transmitted to the child node by the parent node when the feedback signal from the child node indicates that the child node may be configured to support the configuration provided in the schedule by the parent node.

Figure 10:
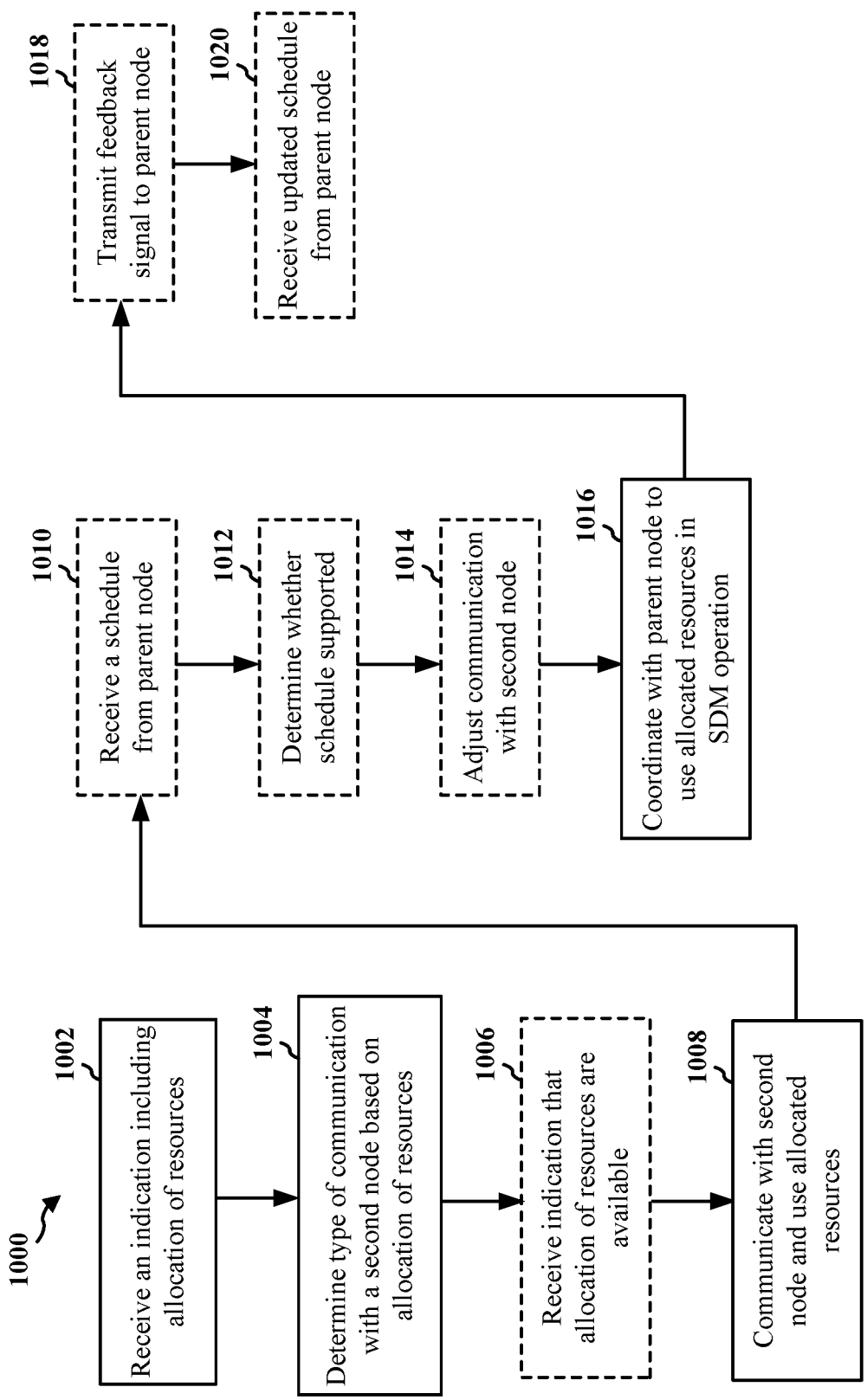
FIG. 10 is a flowchart of a method of wireless communication.

FIG. 10 is a flowchart 1000 of a method of wireless communication. The method may be performed by an IAB node (e.g., 502, 504, 602, 604, 704, 706, 802, 804, 902, 904, 1150, 1450, 1460; the apparatus 1102/1102', 1402/1402') or a UE (e.g., the UE 104, 350, 1160; the apparatus 1102/1102'; the processing system 1214,1514, which may include the memory 360 and which may be the entire UE or a component of the UE, such as the TX processor 368, the RX processor 356, and/or the controller/processor 359). The method may be performed by a base station (e.g., the base station 102, 150, 180; the apparatus 1102/1102', 1402/1402'; the processing system 1214, 1514, which may include the memory 376 and which may be the entire base station or a component of the base station, such as the TX processor 316, the RX processor 370, and/or the controller/processor 375). According to various aspects, one or more of the illustrated operations of method 1000 may be omitted, transposed, and/or contemporaneously performed. Optional aspects are illustrated with a dashed line. The method may enable a child node to locally coordinate with a parent node to utilize allocated resources in a SDM operation between the child node and the parent node.

At 1002, the child node (e.g., IAB node (e.g., 502, 504, 602, 604, 704, 706, 802, 804, 902, 904, 1150, 1450, 1460; the apparatus 1102/1102', 1402/1402'), UE (e.g., the UE 104, 350, 1160; the apparatus 1102/1102'; the processing system 1214,1514, which may include the memory 360 and which may be the entire UE or a component of the UE, such as the TX processor 368, the RX processor 356, and/or the controller/processor 359), base station (e.g., the base station 102, 150, 180; the apparatus 1102/1102', 1402/1402'; the processing system 1214, 1514, which may include the memory 376 and which may be the entire base station or a component of the base station, such as the TX processor 316, the RX processor 370, and/or the controller/processor 375) may receive an indication including an allocation of resources. For example, 1002 may be performed by allocation component 1106 of apparatus 1102. In some aspects, the child node may receive the indication including the allocation of resources from the CU.

At 1004, the child node may determine a type of communication with a second node. For example, 1004 may be performed by determination component 1108 of apparatus 1102. The child node may determine the type of communication with the second node based on the allocation of resources.

At 1006, the child node may receive an indication that the allocation of resources is available. For example, 1006 may be performed by indication component 1110 of apparatus 1102. In some aspects, the child node may utilize the allocation of resources in accordance with the indication received from the parent node.

At 1008, the child node may communicate with the second node based on the determined type of communication and utilize the allocated resources. For example, 1008 may be performed by communication component 1112 of apparatus 1102. In some aspects, the CU may label the allocation of resources for at least the child node as HARD. In some aspects, the CU may label the allocation of resources for the child node as SOFT. The child node may determine the type of communication with the second node based on the labeling of the allocation of resources.

At 1010, the child node may receive a schedule including a configuration for communication between the parent node and the child node. For example, 1010 may be performed by schedule component 1114 of apparatus 1102. The child may receive the schedule from the parent node.

At 1012, the child node may determine whether the configuration for communication provided in the schedule is supported by the child node. For example, 1012 may be performed by support component 1116 of apparatus 1102.

At 1014, the child node may adjust communication with the second node (e.g., its own child node(s)). For example, 1014 may be performed by adjustment component 1118 of apparatus 1102. The child node may adjust communication with the second node when the configuration for communication provided in the schedule is supported by the child node.

At 1016, the child node may coordinate with a parent node to utilize the allocated resources in an SDM operation between the child node and the parent node. For example, 1016 may be performed by coordination component 1120 of apparatus 1102.

At 1018, the child node may transmit a feedback signal to the parent node prior to communicating with the second node. For example, 1018 may be performed by feedback component 1122 of apparatus 1102. The child node may transmit the feedback signal to the parent node prior to communicating with the second node as part of the coordination with the parent node. In some aspects, the feedback signal may include one or more capabilities or conditions of SDM operation of the child node. In some aspects, the feedback signal may include a schedule for the parent node to communicate with the child node. The schedule may include instructions for the parent node to utilize a subset of the allocation of resources to communicate with the child node. In some aspects, the conditions of SDM operation of the child node may be set by the CU or the child node. In some aspects, the feedback signal may include a configuration of spatial resources for communicating with the child node. The configuration of spatial resources may include an indication of one or more beams or links for communicating with the child node.

In some aspects, to coordinate with the parent node, the child node may transmit a feedback signal to the parent node in response to receipt of the schedule from the parent node. The feedback signal may indicate whether the child node may support the configuration for communication provided in the schedule. In some aspects, the child node may transmit a feedback signal prior to receiving the indication from the parent node that the allocation of resources is available. In such aspects, the feedback signal may include one or more capabilities or conditions of SDM operation of the child node. The feedback signal may include a schedule for the child node to communicate with the parent node. In some aspects, the feedback signal may include suggested conditions in the manner in which the parent node utilizes its allocation of resources. In some aspects, the indication from the parent node indicating that the allocation of resources is available may further indicate whether use of the allocation of resources by the child node is unconditional or subject to conditions. In some aspects, the child node may transmit a feedback signal after utilizing the allocated resources. In some aspects, the feedback signal may include one or more capabilities or conditions of SDM operation of the child node. The feedback signal may include a schedule including a configuration for communication between the parent node and the child node.

Lastly, at 1020, the child node may receive from the parent node an updated schedule in response to the feedback signal. For example, 1020 may be performed by update component 1124 of apparatus 1102. In some aspects, the child node may receive the updated schedule from the parent node when the child node is configured to support the configuration provided in the schedule. In some aspects, the child node may receive the updated schedule from the parent node when the parent node is configured to support SDM operation of the child node.

Figure 11:
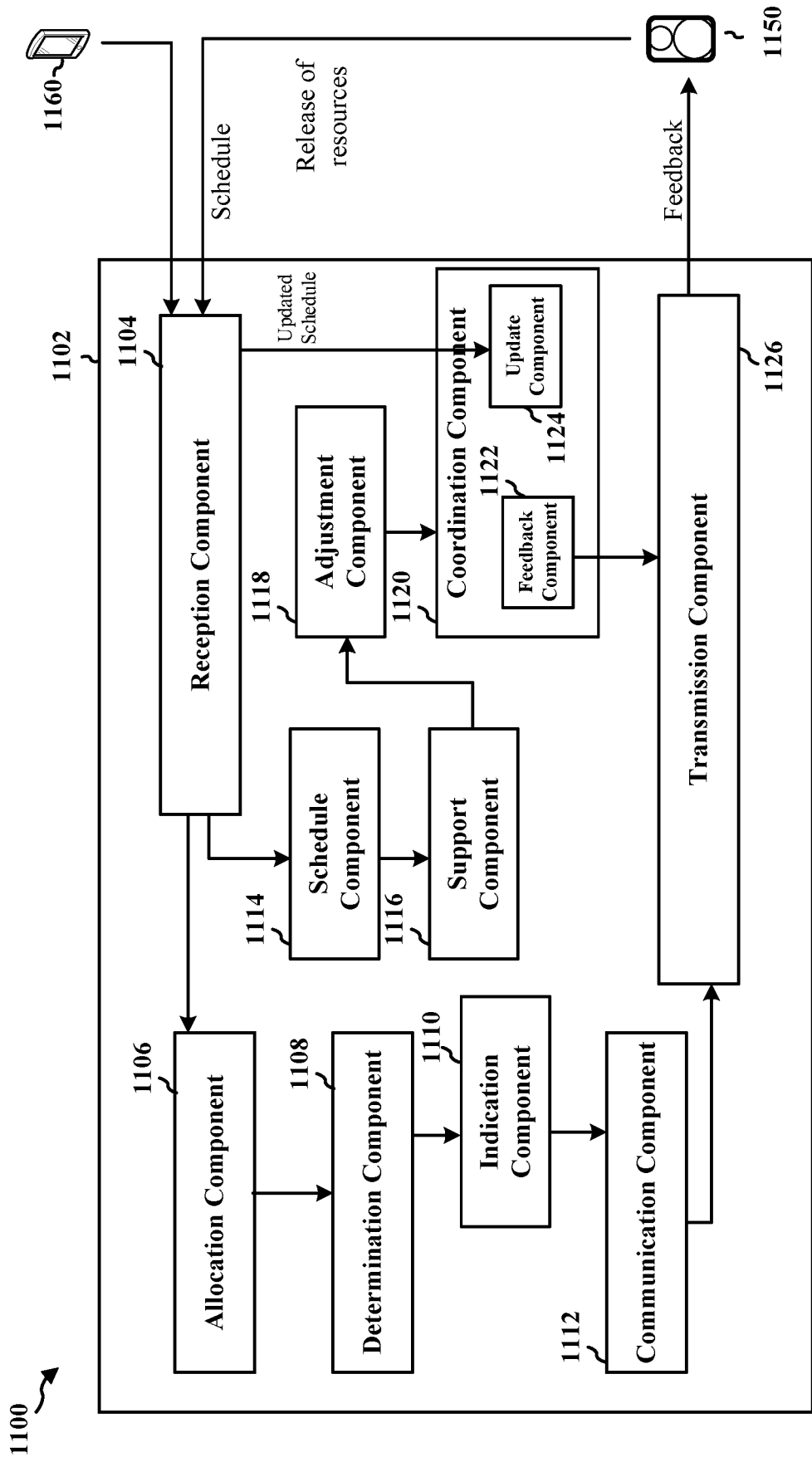
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be an IAB node, a UE, or a base station. The apparatus includes a reception component 1104 that may receive transmission from the CU, a parent node (e.g., 1150), or one or more child nodes (e.g., UE 1160), e.g., as described in connection with 1002 of FIG. 10. The apparatus includes an allocation component 1106 that receives an indication including an allocation of resources, e.g., as described in connection with 1002 of FIG. 10. The apparatus includes a determination component 1108 that determines a type of communication with a second node based on the allocation of resources, e.g., as described in connection with 1004 of FIG. 10. The apparatus includes an indication component 1110 that receives an indication from the parent node that the allocation of resources is available, e.g., as described in connection with 1006 of FIG. 10. In some aspects, the child node may utilize the allocation of resources in accordance with the indication from the parent node. The apparatus includes a communication component 1112 that communicates with the second node based on the determined type of communication and utilizes the allocated resources, e.g., as described in connection with 1008 of FIG. 10. The apparatus includes a schedule component 1114 that receives from the parent node a schedule including a configuration for communication between the parent node and the child node, e.g., as described in connection with 1010 of FIG. 10. The apparatus includes a support component 1116 that determines whether the configuration for communication provided in the schedule is supported by the child node, e.g., as described in connection with 1012 of FIG. 12. The apparatus includes an adjustment component 1118 that may adjust communication of the child node with the second node when the configuration for communication provided in the schedule is supported by the child node, e.g., as described in connection with 1014 of FIG. 10. The apparatus includes a coordination component 1120 that may coordinate with the parent node to utilize the allocated resources in an SDM operation between the child node and the parent node, e.g., as described in connection with 1016 of FIG. 10. The apparatus includes a feedback component 1122 that transmits a feedback signal to the parent node prior to communicating with the second node, e.g., as described in connection with 1018 of FIG. 10. The feedback signal may include one or more capabilities or conditions of SDM operation of the child node. In some aspects, the feedback component 1122 may transmit a feedback signal to the parent node in response to receiving the schedule from the parent node. The feedback signal may indicate whether the child node supports the configuration for communication provided in the schedule. In some aspects, the feedback component 1122 may transmit a feedback signal to the parent node prior to receiving the indication from the parent node that the allocation of resources is available. In some aspects, the feedback signal may include one or more capabilities or conditions of SDM operation of the child node. In some aspects, the feedback component 1122 may transmit a feedback signal to the parent node after utilizing the allocated resources. The feedback signal may include one or more capabilities or conditions of SDM operation of the child node. The apparatus includes an update component 1124 that receives an updated schedule from the parent node in response to the feedback signal when the child node is configured to support the configuration provided in the schedule, e.g., as described in connection with 1020 of FIG. 10. In some aspects, the update component 1124 may receive an updated schedule in response to the feedback signal when the parent node is configured to support SDM operation of the child node.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
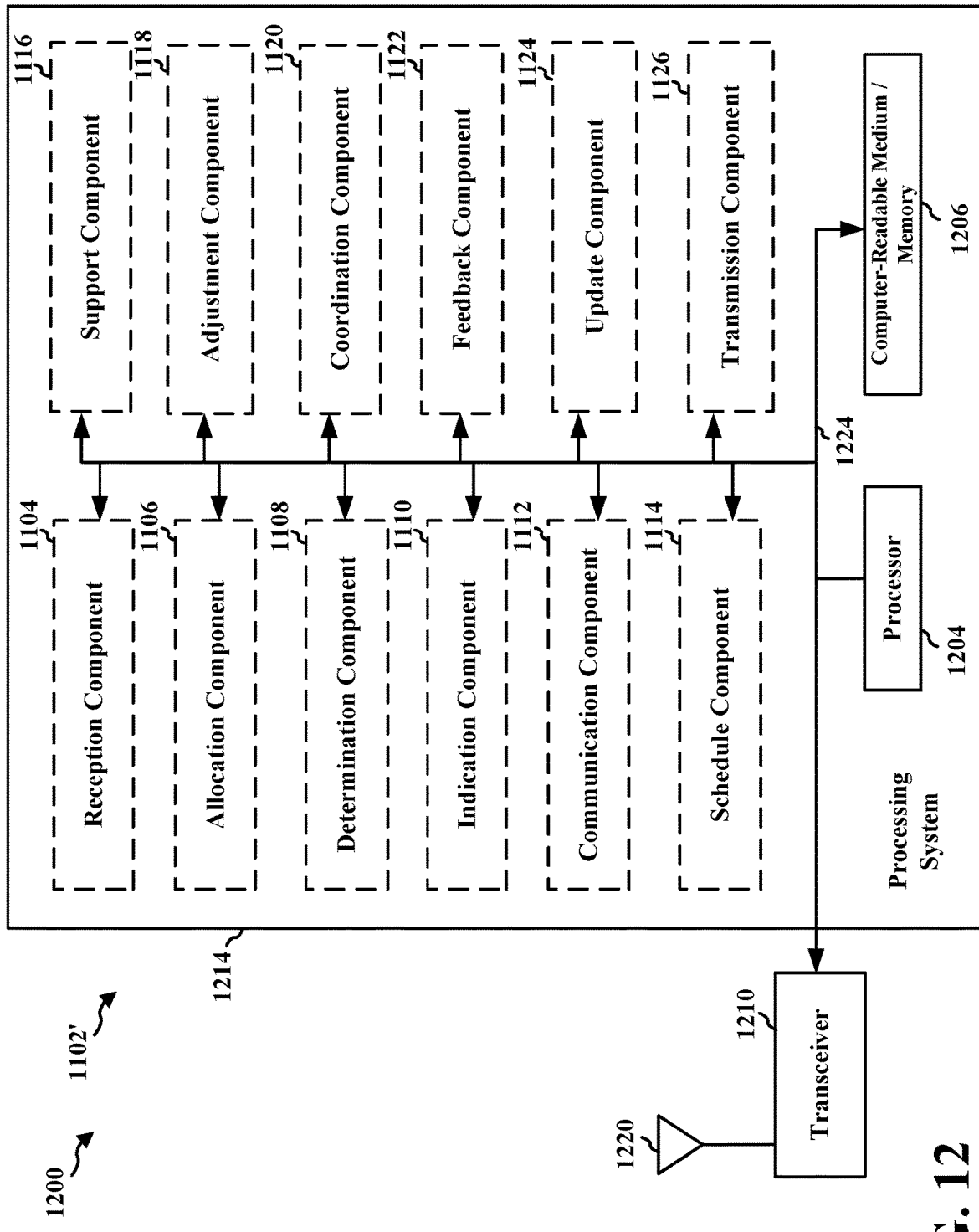
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, 1122, 1124, 1126 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1126, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120, 1122, 1124, 1126. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3). In some aspects, the processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for receiving, from a central unit (CU), an indication including an allocation of resources. The apparatus includes means for determining a type of communication with a second node based on the allocation of resources. The apparatus includes means for communicating with the second node based on the determined type of communication and utilizing the allocated resources. The apparatus includes means for coordinating with a parent node to utilize the allocated resources in an SDM operation between the child node and the parent node. The apparatus may further include means for transmitting a feedback signal to the parent node prior to communicating with the second node. The feedback signal may include one or more capabilities or conditions of SDM operation of the child node. The apparatus may further include means for receiving, from the parent node, a schedule including a configuration for communication between the parent node and the child node. The apparatus may further include means for determining, by the child node, whether the configuration for communication provided in the schedule is supported by the child node. The apparatus may further include means for adjusting, by the child node, communication with the second node when the configuration for communication provided in the schedule is supported by the child node. The apparatus may further include means for transmitting a feedback signal to the parent node in response to receipt of the schedule from the parent node. The feedback signal may indicate whether the child node supports the configuration for communication provided in the schedule. The apparatus may further include means for receiving, from the parent node, an updated schedule in response to the feedback signal when the child node is configured to support the configuration provided in the schedule. The apparatus may further include means for receiving, from the parent node, an indication that the allocation of resources is available. The child node may utilize the allocation of resources in accordance with the indication from the parent node. The apparatus may further include means for transmitting, to the parent node, a feedback signal prior to receiving the indication from the parent node that the allocation of resources is available. The feedback signal may include one or more capabilities or conditions of SDM operation of the child node. The apparatus may further include means for transmitting, to the parent node, a feedback signal after utilizing the allocated resources. The feedback signal may include one or more capabilities or conditions of SDM operation of the child node. The apparatus may further include means for receiving, from the parent node, an updated schedule in response to the feedback signal when the parent node is configured to support SDM operation of the child node. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. In yet some aspects, as described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
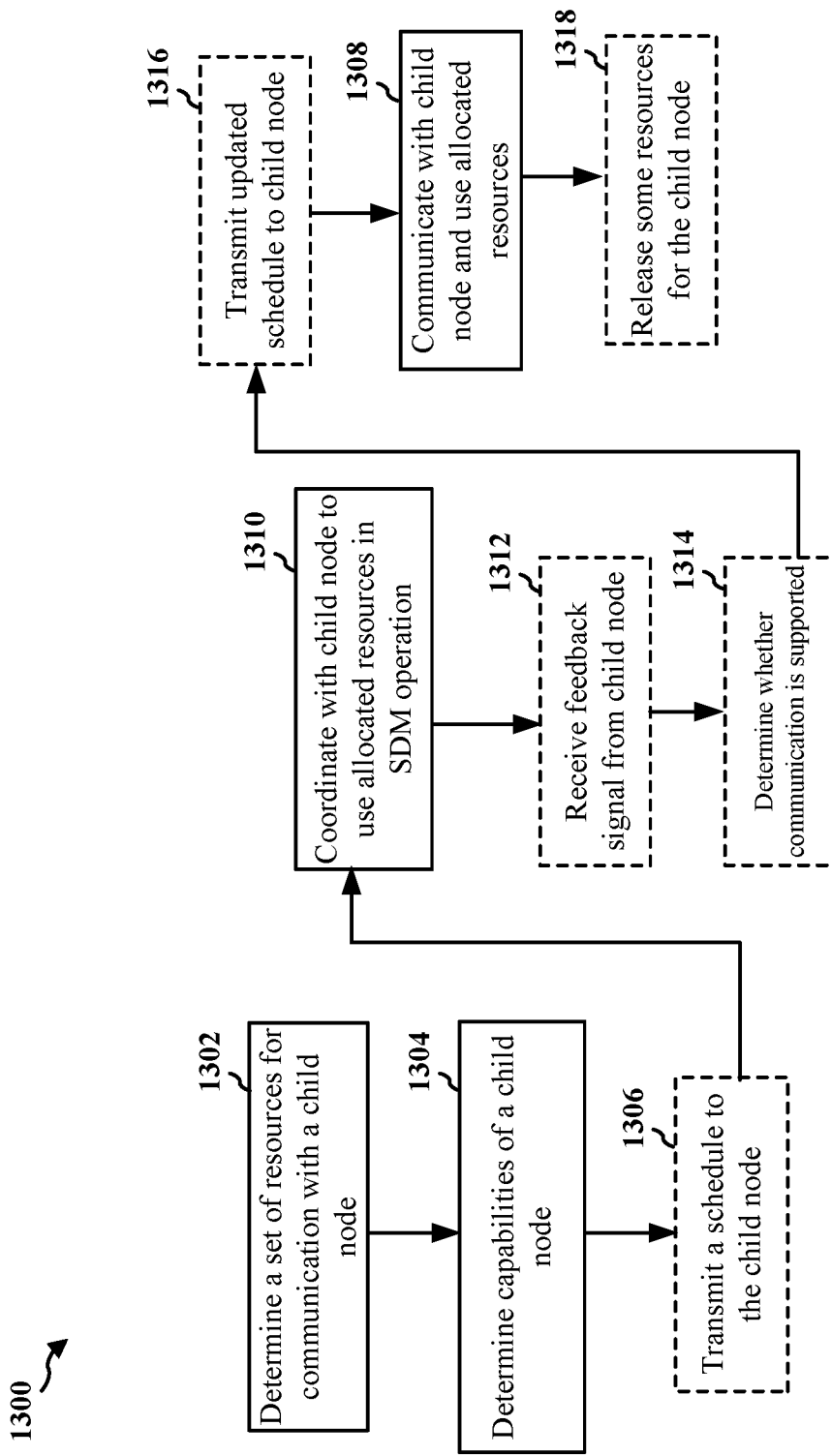
FIG. 13 is a flowchart of a method of wireless communication.

FIG. 13 is a flowchart 1300 of a method of wireless communication. The method may be performed by an IAB node (e.g., 502, 504, 602, 604, 704, 706, 802, 804, 902, 904, 1150, 1450, 1460; the apparatus 1102/1102', 1402/1402') or a UE (e.g., the UE 104, 350, 1160; the apparatus 1102/1102'; the processing system 1214,1514, which may include the memory 360 and which may be the entire UE or a component of the UE, such as the TX processor 368, the RX processor 356, and/or the controller/processor 359). The method may be performed by a base station (e.g., the base station 102, 150, 180; the apparatus 1102/1102', 1402/1402'; the processing system 1214, 1514, which may include the memory 376 and which may be the entire base station or a component of the base station, such as the TX processor 316, the RX processor 370, and/or the controller/processor 375). According to various aspects, one or more of the illustrated operations of method 1300 may be omitted, transposed, and/or contemporaneously performed. Optional aspects are illustrated with a dashed line. The method may enable a parent node to locally coordinate with a child node to utilize allocated resources in a SDM operation between the child node and the parent node.

At 1302, the parent node (e.g., IAB node (e.g., 502, 504, 602, 604, 704, 706, 802, 804, 902, 904, 1150, 1450, 1460; the apparatus 1102/1102', 1402/1402'), UE (e.g., the UE 104, 350, 1160; the apparatus 1102/1102'; the processing system 1214,1514, which may include the memory 360 and which may be the entire UE or a component of the UE, such as the TX processor 368, the RX processor 356, and/or the controller/processor 359), or base station (e.g., the base station 102, 150, 180; the apparatus 1102/1102', 1402/1402'; the processing system 1214, 1514, which may include the memory 376 and which may be the entire base station or a component of the base station, such as the TX processor 316, the RX processor 370, and/or the controller/processor 375) may determine a set of resources for communication with a child node. For example, 1302 may be performed by allocation component 1406 of apparatus 1402. In some aspects, to determine the set of resources, the parent node may receive an indication including the set of resources for communication with the child node. In some aspects, the parent node may receive the indication from a CU.

At 1304, the parent node may determine the type of communication with or capabilities of a child node. For example, 1304 may be performed by determination component 1408 of apparatus 1402. The capabilities may include spatial division multiplex (SDM) or frequency division multiplex (FDM). In some aspects, the parent node may determine the type of communication with or capabilities of a second node (e.g., child node) based on the allocation of resources. In some aspects, the allocation of resources for the parent node may be labeled as HARD, and the child node labeled as HARD. In some aspects, the allocation of resources for the parent node may be labeled as SOFT. The parent node may determine the type of communication with or capabilities of the child node based on the labeling of the allocation of resources. In some aspects, the labeling of the resources for the parent node or the child node may be labeled by the CU.

In some aspects, for example at 1306, the parent node may transmit to the child node, a schedule. For example, 1306 may be performed by schedule component 1410 of apparatus 1402. The schedule may include a configuration for communication between the parent node and the child node.

At 1310, the parent node may coordinate with the child node to utilize the allocated resources. For example, 1310 may be performed by coordination component 1414 of apparatus 1402. The parent node may coordinate with the child node to utilize the allocated resources in an SDM operation between the child node and the parent node.

In some aspects, for example, at 1312, the parent node, to coordinate with at least the child node, may receive a feedback signal. For example, 1312 may be performed by feedback component 1416 of apparatus 1402. In some aspects, the parent node may receive the feedback signal prior to utilizing the allocated resources. The parent node may receive the feedback signal from the child node. In some aspects, the feedback signal may include one or more capabilities or conditions of SDM communications of the child node. In some aspects, the feedback signal may indicate whether the child node supports the configuration for communication provided in the schedule. In some aspects, the feedback signal may include conditions on the manner in which the parent node may be configured to utilize the resources allocated from the CU. In some aspects, the parent node may utilize the allocation of resources unconditionally or subject to conditions. The conditions may be imposed by the CU, the parent node, or by at least the child node. In some aspects, the feedback signal may include a schedule for the child node to communicate with the parent node. In some aspects, the parent node may receive a feedback signal indicating whether the child node supports the configuration for communication provided in the schedule by the parent node. In some aspects, the parent node may receive a feedback signal after utilizing the allocated resources. The feedback signal may include one or more capabilities or conditions of SDM communication of the child node.

In some aspects, for example at 1314, the parent node may determine whether SDM communication of the child node is supported by the parent node. For example, 1314 may be performed by support component 1418 of apparatus 1402. In some aspects, the parent node may determine whether SDM communication of the child node is supported by the parent node in response to the received feedback signal.

In some aspects, for example, at 1316, the parent node may transmit an updated schedule to the child node. For example, 1316 may be performed by update component 1420 of apparatus 1402. In some aspects, the parent node may transmit the updated schedule to the child node when SDM communication of the child node may be supported by the parent node. In some aspects, an updated schedule may be transmitted to the child node by the parent node when the feedback signal from the child node indicates that the child node may be configured to support the configuration provided in the schedule by the parent node.

At 1308, the parent node may communicate with the child node. For example, 1308 may be performed by communication component 1412 of apparatus 1402. In some aspects, the parent node may communicate with the child node based on the capabilities and set of resources. In some aspects, the parent node may communicate with the child node based on the determined type of communication and utilize the allocated resources.

In some aspects, for example at 1318, the parent node may release at least some resources of the allocation of resources for use by the child node. For example, 1318 may be performed by release component 1422 of apparatus 1402. In some aspects, the release of the at least some resources may be unconditional or subject to conditions. The conditions may be imposed by the parent node.

Figure 14:
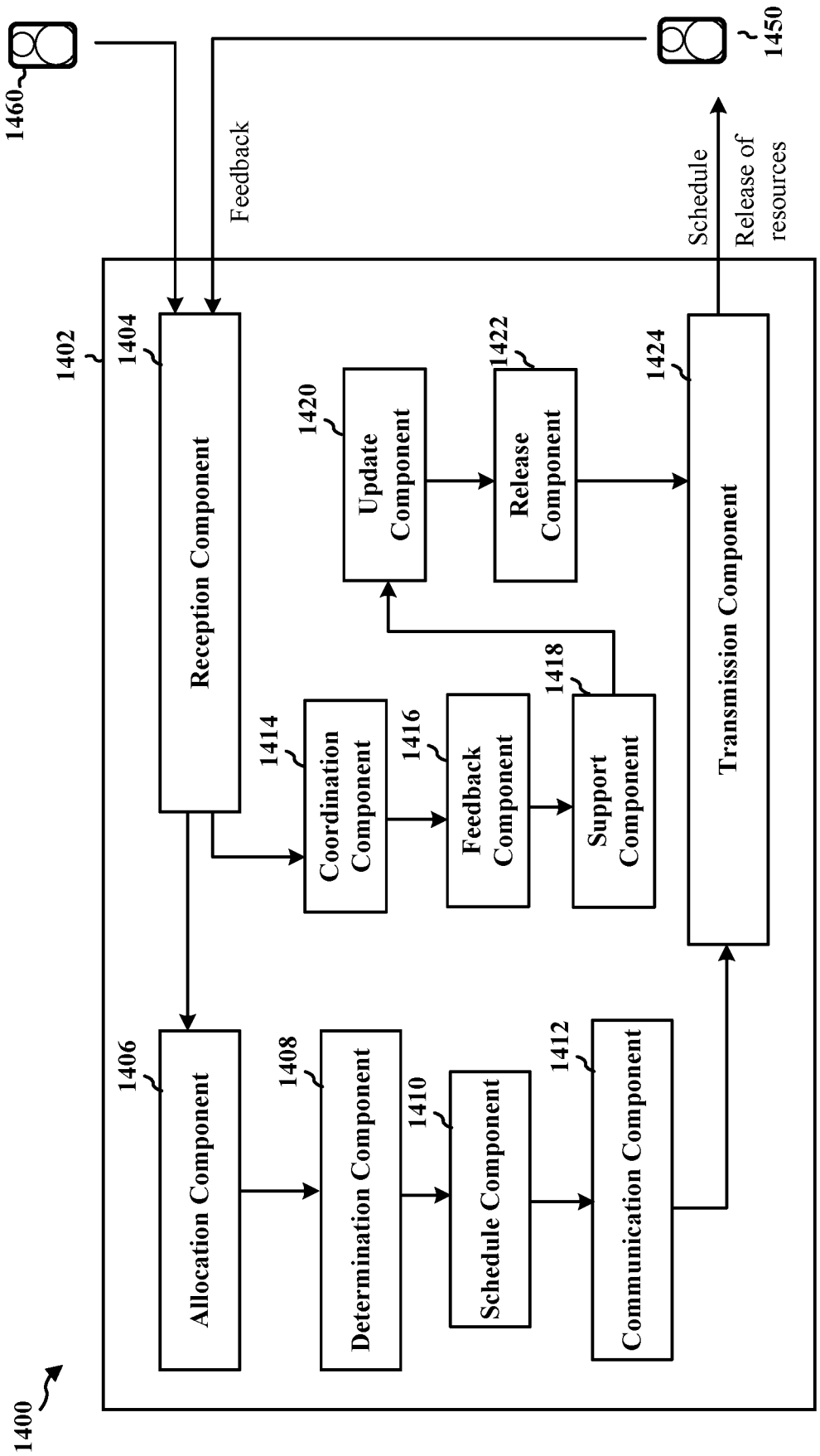
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be an IAB node, a UE, or a base station. The apparatus includes a reception component 1404 that may receive transmissions from the CU, a parent node (e.g., grandparent node 1460), or one or more child nodes 1450, e.g., as described in connection with 1302 or 1312 of FIG. 13. The apparatus includes an allocation component 1406 that receives an indication including an allocation of resources, e.g., as described in connection with 1302 of FIG. 13. The apparatus includes a determination component 1408 that determines the type of communication with the child node (e.g., 1450) based on the allocation of resources, e.g., as described in connection with 1304 of FIG. 13. The apparatus includes a schedule component 1410 that transmits, to the child node, a schedule including a configuration for communication between the parent node (e.g., 1402) and the child node (e.g., 1450), e.g., as described in connection with 1306 of FIG. 13. The apparatus includes a communication component 1412 that communicates with the child node (e.g., 1450) based on the determined type of communication and utilizes the allocated resources, e.g., as described in connection with 1308 of FIG. 13. The apparatus includes a coordination component 1414 that coordinates with the child node (e.g., 1450) to utilize the allocated resources in an SDM operation between the child node and the parent node (e.g., 1402), e.g., as described in connection with 1310 of FIG. 13. The apparatus includes a feedback component 1416 that receives a feedback signal from the child node (e.g., 1450), e.g., as described in connection with 1312 of FIG. 13. In some aspects, the feedback signal may be received prior to the parent node (e.g., 1402) utilizing the allocated resources. The feedback signal may include one or more capabilities or conditions of SDM communication of the child node (e.g., 1450). In some aspects, the feedback signal may indicate whether the child node supports the configuration for communication provided in the schedule from the parent node (e.g., 1402). In some aspects, the feedback signal may further include conditions on the manner in which the parent node (e.g., 1402) may be configured to utilize the resources allocated from the CU. The conditions may be imposed by the CU or at least the child node. In some aspects, the feedback signal may be received from the child node after utilizing the allocated resources. The feedback signal may include one or more capabilities of SDM communication of the child node. The apparatus includes a support component 1418 that determines whether SDM communication of the child node is supported by the parent node, e.g., as described in connection with 1314 of FIG. 13. The apparatus includes an update component 1420 that transmits an updated schedule to the child node when the feedback signal, from the child node, indicates that the child node may be configured to support the configuration provided in the schedule, e.g., as described in connection with 1316 of FIG. 13. The apparatus includes a release component 1422 that releases at least some resources of the allocation of resources for use by the child node, e.g., as described in connection with 1318 of FIG. 13. In some aspects, the release of at least some resources, by the parent node, may be unconditional or subject to conditions. The apparatus includes a transmission component 1424 that transmits signals and/or data to child node (e.g. 1450) or the parent node (e.g., grandparent node 1460), e.g., as described in connection with 1306, 1308, 1316 of FIG. 13.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
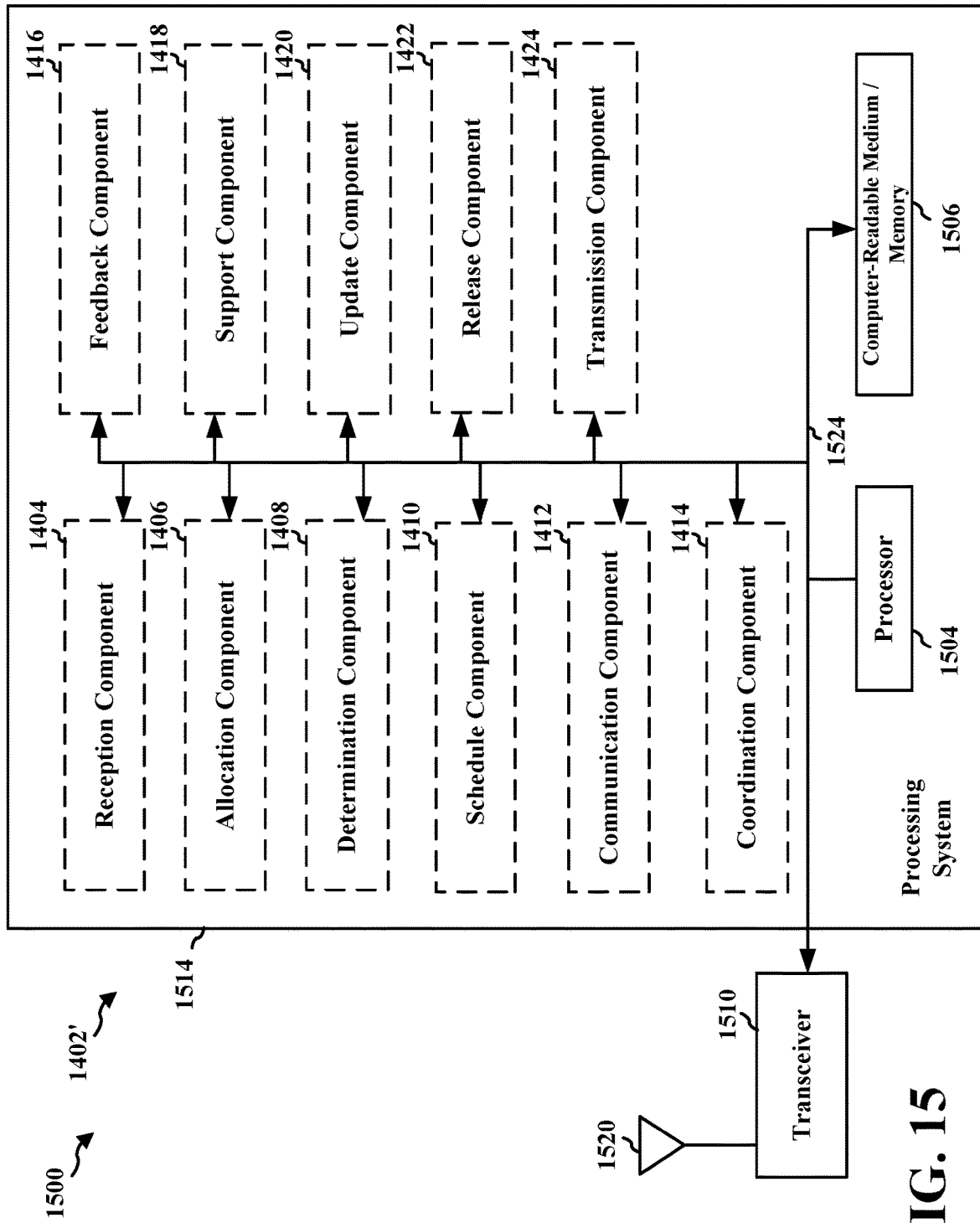
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, 1420, 1422 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1424, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412,

1414, 1416, 1418, 1420, 1422, 1424. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3). In some aspects, the processing system 1514 may be a component of the UE 350 and may include the memory 360 and/or at least one of the TX processor 368, the RX processor 356, and the controller/processor 359. Alternatively, the processing system 1514 may be the entire UE (e.g., see 350 of FIG. 3).

In one configuration, the apparatus 1402/1402' for wireless communication includes means for determining a set of resources for communication with a child node. The apparatus includes means for determining capabilities of a child node. The capabilities include SDM or FDM. The apparatus includes means for communicating with the child node based on the capabilities and set of resources. The apparatus may further include means for coordinating with the child node to utilize the allocated resources in a SDM operation between the child node and the parent node. The apparatus may further include means for receiving a feedback signal prior to utilizing the allocated resources. The feedback signal may include one or more capabilities or conditions of SDM communication of the child node. The apparatus may further include means for transmitting a schedule including a configuration for communication between the parent node and the child node. The apparatus may further include means for receiving a feedback signal indicating whether the child node supports the configuration for communication provided in the schedule. The apparatus may further include means for transmitting an updated schedule when the feedback signal indicates that the child node is configured to support the configuration provided in the schedule. The apparatus may further include means for receiving a feedback signal prior to utilizing the allocated resources. The feedback signal including one or more capabilities or conditions of SDM communication of the child node. The apparatus may further include means for releasing at least some resources of the allocation of resources for use by the child node. The release of the at least some resources may be unconditional or subject to conditions. The apparatus may further include means for receiving a feedback signal after utilizing the allocated resources. The feedback signal including one or more capabilities or conditions of SDM communication of the child node. The apparatus may further include means for determining whether SDM communication of the child node is supported by the parent node. The apparatus may further include means for transmitting an updated schedule when SDM communication of the child node is supported by the parent node. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. In yet some aspects, as described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a child node, comprising:
   reporting a duplexing capability to a central unit (CU);
   receiving, from the CU, a first indication including an allocation of resources;
   utilizing the allocation of resources to communicate with a second node based on a type indicated for respective resources in the allocation of resources; and
   coordinating with a parent node to utilize the allocation of resources based on communication with the second node.

2. The method of claim 1, wherein coordinating with the parent node comprises:

transmitting information to the parent node prior to communicating with the second node, the information indicating one or more capabilities or conditions of a spatial division multiplex (SDM) operation of the child node.

3. The method of claim 2, wherein the information includes a schedule for the parent node to communicate with the child node.

4. The method of claim 3, wherein the schedule includes instructions for the parent node to utilize a subset of the allocation of resources to communicate with the child node.

5. The method of claim 2, wherein the conditions of the SDM operation of the child node are set by the CU or the child node.

6. The method of claim 2, wherein the information indicates a configuration of spatial resources for communicating with the child node.

7. The method of claim 6, wherein the configuration of the spatial resources indicates one or more beams or links for communicating with the child node.

8. The method of claim 1, further comprising:
receiving, from the parent node, a schedule including a configuration for additional communication between the parent node and the child node;
determining, by the child node, whether the configuration for the additional communication provided in the schedule is supported by the child node; and
adjusting, by the child node, the communication with the second node when the configuration for the additional communication provided in the schedule is supported by the child node.

9. The method of claim 8, wherein coordinating with the parent node further comprises:
transmitting a feedback signal to the parent node in response to receipt of the schedule from the parent node, the feedback signal indicating whether the child node supports the configuration for the additional communication provided in the schedule; and
receiving, from the parent node, an updated schedule in response to the feedback signal when the child node is configured to support the configuration provided in the schedule.

10. The method of claim 1, wherein the CU has labeled the allocation of resources for at least the child node as HARD, wherein the child node determines the type of the communication with the second node based on a labeling of the allocation of resources.

11. The method of claim 1, further comprising:
receiving, from the parent node, a third indication that the allocation of resources are available, wherein the child node utilizes the allocation of resources in accordance with the third indication from the parent node.

12. The method of claim 11, wherein coordinating with the parent node further comprises:
transmitting, to the parent node, a feedback signal prior to receiving the third indication from the parent node that the allocation of resources are available, wherein the feedback signal includes one or more capabilities or conditions of a spatial division multiplex (SDM) operation of the child node.

13. The method of claim 12, wherein the feedback signal includes a schedule for the child node to communicate with the parent node.

14. The method of claim 12, wherein the feedback signal includes suggested conditions in a manner in which the parent node utilizes its allocation of resources.

15. The method of claim 11, wherein the third indication, from the parent node, that the allocation of resources are available further indicates whether use of the allocation of resources by the child node is unconditional or subject to conditions.

16. The method of claim 11, wherein coordinating with the parent node further comprises:
transmitting, to the parent node, a feedback signal after utilizing the allocation of resources, the feedback signal including one or more capabilities or conditions of a spatial division multiplex (SDM) operation of the child node; and
receiving, from the parent node, an updated schedule in response to the feedback signal when the parent node is configured to support the SDM operation of the child node.

17. The method of claim 16, wherein the feedback signal includes a schedule including a configuration for additional communication between the parent node and the child node.

18. The method of claim 11, wherein the CU has labeled the allocation of resources for the child node as SOFT, wherein the child node determines the type of the communication with the second node based on a labeling of the allocation of resources.

19. The method of claim 1, wherein the type determined for the communication comprises a spatial division multiplex (SDM) operation between the child node and the parent node.

20. The method of claim 1, wherein coordinating with the parent node includes providing information, to the parent node, indicating one or more transmit or receive beams for communicating with the child node.

21. The method of claim 1, wherein, for each of the respective resources, the type includes one of hard, soft, or unavailable.

22. An apparatus for wireless communication at a child node, comprising:
means for reporting a duplexing capability to a central unit (CU);
means for receiving, from the CU, a first indication including an allocation of resources;
means for utilizing the allocation of resources to communicate with a second node based on a type indicated for respective resources in the allocation of resources; and
means for coordinating with a parent node to utilize the allocation of resources based on communication with the second node.

23. The apparatus of claim 22, wherein the means for coordinating with the parent node comprises:
means for transmitting information to the parent node prior to communicating with the second node, the information indicating one or more capabilities or conditions of a spatial division multiplex (SDM) operation of the child node.

24. The apparatus of claim 23, wherein the information includes a schedule for the parent node to communicate with the child node.

25. The apparatus of claim 24, wherein the schedule includes instructions for the parent node to utilize a subset of the allocation of resources to communicate with the child node.

26. The apparatus of claim 23, wherein the conditions of the SDM operation of the child node are set by the CU or the child node.

27. The apparatus of claim 23, wherein the information indicates a configuration of spatial resources for communicating with the child node.

28. The apparatus of claim 27, wherein the configuration of the spatial resources indicates one or more beams or links for communicating with the child node.

29. The apparatus of claim 22, further comprising:
means for receiving, from the parent node, a schedule including a configuration for additional communication between the parent node and the child node;
means for determining, by the child node, whether the configuration for the additional communication provided in the schedule is supported by the child node; and
means for adjusting, by the child node, the communication with the second node when the configuration for the additional communication provided in the schedule is supported by the child node.

30. The apparatus of claim 29, wherein the means for coordinating with the parent node further comprises:
means for transmitting a feedback signal to the parent node in response to receipt of the schedule from the parent node, the feedback signal indicating whether the child node supports the configuration for the additional communication provided in the schedule; and
means for receiving, from the parent node, an updated schedule in response to the feedback signal when the child node is configured to support the configuration provided in the schedule.

31. The apparatus of claim 22, wherein the CU has labeled the allocation of resources for at least the child node as HARD, wherein the means for determining are configured to determine the type of the communication with the second node based on a labeling of the allocation of resources.

32. The apparatus of claim 22, further comprising:
means for receiving, from the parent node, a third indication that the allocation of resources are available, wherein the means for utilizing the allocation are configured to utilize the allocation of resources in accordance with the third indication from the parent node.

33. The apparatus of claim 32, wherein the means for coordinating with the parent node further comprises:
means for transmitting, to the parent node, a feedback signal prior to receiving the third indication from the parent node that the allocation of resources are available, wherein the feedback signal includes one or more capabilities or conditions of a spatial division multiplex (SDM) operation of the child node.

34. The apparatus of claim 33, wherein the feedback signal includes a schedule for the child node to communicate with the parent node.

35. The apparatus of claim 33, wherein the feedback signal includes suggested conditions in a manner in which the parent node utilizes its allocation of resources.

36. The apparatus of claim 32, wherein the third indication, from the parent node, that the allocation of resources are available further indicates whether use of the allocation of resources by the child node is unconditional or subject to conditions.

37. The apparatus of claim 32, wherein the means for coordinating with the parent node comprises:
means for transmitting, to the parent node, a feedback signal after utilizing the allocation of resources, the feedback signal including one or more capabilities or conditions of a spatial division multiplex (SDM) operation of the child node; and
means for receiving, from the parent node, an updated schedule in response to the feedback signal when the parent node is configured to support the SDM operation of the child node.

38. The apparatus of claim 37, wherein the feedback signal includes a schedule including a configuration for additional communication between the parent node and the child node.

39. The apparatus of claim 32, wherein the CU has labeled the allocation of resources for the child node as SOFT, wherein the means for determining are configured to determine the type of the communication with the second node based on a labeling of the allocation of resources.

40. The apparatus of claim 22, wherein the type determined for the communication comprises a spatial division multiplex (SDM) operation between the child node and the parent node.

41. An apparatus for wireless communication at a child node, comprising:
a memory; and
at least one processor coupled to the memory and configured to:
report a duplexing capability to a central unit (CU);
receive, from the CU, a first indication including an allocation of resources;
utilize the allocation of resources to communicate with a second node based on a type indicated for respective resources in the allocation of resources; and
coordinate with a parent node to utilize the allocation of resources based on communication with the second node.

42. The apparatus of claim 41, wherein to coordinate with the parent node, the at least one processor is configured to:
transmit information to the parent node prior to communicating with the second node, the information indicating one or more capabilities or conditions of a spatial division multiplex (SDM) operation of the child node.

43. The apparatus of claim 42, wherein the information indicates a schedule for the parent node to communicate with the child node.

44. The apparatus of claim 43, wherein the schedule includes instructions for the parent node to utilize a subset of the allocation of resources to communicate with the child node.

45. The apparatus of claim 42, wherein the conditions of the SDM operation of the child node are set by the CU or the child node.

46. The apparatus of claim 42, wherein the information indicates a configuration of spatial resources for communicating with the child node.

47. The apparatus of claim 46, wherein the configuration of the spatial resources indicates one or more beams or links for communicating with the child node.

48. The apparatus of claim 41, the at least one processor further configured to:
receive, from the parent node, a schedule including a configuration for additional communication between the parent node and the child node;
determine whether the configuration for the additional communication provided in the schedule is supported by the child node; and
adjust the communication with the second node when the configuration for the additional communication provided in the schedule is supported by the child node.

49. The apparatus of claim 48, wherein to coordinate with the parent node, the at least one processor further configured to:

transmit a feedback signal to the parent node in response to receipt of the schedule from the parent node, the feedback signal indicating whether the child node supports the configuration for the additional communication provided in the schedule; and receive, from the parent node, an updated schedule in response to the feedback signal when the child node is configured to support the configuration provided in the schedule.

50. The apparatus of claim 41, the at least one processor further configured to:

receive, from the parent node, a third indication that the allocation of resources are available, wherein the at least one processor is configured to utilize the allocation of resources in accordance with the third indication from the parent node.

51. The apparatus of claim 50, wherein to coordinate with the parent node, the at least one processor is configured to:

transmit, to the parent node, a feedback signal prior to receiving the third indication from the parent node that the allocation of resources are available, wherein the feedback signal includes one or more capabilities or conditions of a spatial division multiplex (SDM) operation of the child node.

52. The apparatus of claim 51, wherein the feedback signal includes a schedule for the child node to communicate with the parent node.

53. The apparatus of claim 51, wherein the feedback signal includes suggested conditions in a manner in which the parent node utilizes its allocation of resources.

54. The apparatus of claim 51, wherein the feedback signal includes a schedule including a configuration for additional communication between the parent node and the child node.

55. The apparatus of claim 50, wherein to coordinate with the parent node, the at least one processor further configured to:

transmit, to the parent node, a feedback signal after utilizing the allocation of resources, the feedback signal including one or more capabilities or conditions of spatial division multiplex (SDM) operation of the child node; and receive, from the parent node, an updated schedule in response to the feedback signal when the parent node is configured to support the SDM operation of the child node.

56. The apparatus of claim 50, wherein the third indication, from the parent node, that the allocation of resources are available further indicates whether use of the allocation of resources by the child node is unconditional or subject to conditions.

57. The apparatus of claim 50, wherein the CU has labeled the allocation of resources for the child node as SOFT, wherein the at least one processor is configured to determine the type of the communication with the second node based on a labeling of the allocation of resources.

58. The apparatus of claim 41, wherein the CU has labeled the allocation of resources for at least the child node as HARD, wherein the at least one processor is configured to determine the type of the communication with the second node based on a labeling of the allocation of resources.

59. The apparatus of claim 41, wherein the type determined for the communication comprises a spatial division multiplex (SDM) operation between the child node and the parent node.

60. The apparatus of claim 41, wherein to coordinate with the parent node, the at least one processor is configured to provide information, to the parent node, indicating one or more transmit or receive beams for communication with the child node.

61. The apparatus of claim 41, wherein, for each of the respective resources, the type includes one of hard, soft, or unavailable.

62. A non-transitory computer-readable medium storing computer executable instructions that when executed by at least one processor of a child node, cause the at the child node to:

report a duplexing capability to a central unit (CU);

receive, from the CU, a first indication including an allocation of resources;

utilize the allocation of resources to communicate with a second node based on a type indicated for respective resources in the allocation of resources; and coordinate with a parent node to utilize the allocation of resources based on communication with the second node.

63. The non-transitory computer-readable medium of claim 62, wherein to coordinate with the parent node, the computer executable instructions, when executed by the at least one processor, causes the child node to:

transmit information to the parent node prior to communicating with the second node, the information indicating one or more capabilities or conditions of a spatial division multiplex (SDM) operation of the child node.

64. The non-transitory computer-readable medium of claim 63, wherein the information indicates a schedule for the parent node to communicate with the child node.

65. The non-transitory computer-readable medium of claim 64, wherein the schedule includes instructions for the parent node to utilize a subset of the allocation of resources to communicate with the child node.

66. The non-transitory computer-readable medium of claim 63, wherein the conditions of the SDM operation of the child node are set by the CU or the child node.

67. The non-transitory computer-readable medium of claim 63, wherein the information indicates a configuration of spatial resources for communicating with the child node.

68. The non-transitory computer-readable medium of claim 67, wherein the configuration of spatial resources indicates one or more beams or links for communicating with the child node.

69. The non-transitory computer-readable medium of claim 62, wherein the computer executable instructions, when executed by the at least one processor, further causes the child node to:

receive, from the parent node, a schedule including a configuration for additional communication between the parent node and the child node;

determine, by the child node, whether the configuration for the additional communication provided in the schedule is supported by the child node; and adjust, by the child node, the communication with the second node when the configuration for the additional communication provided in the schedule is supported by the child node.

70. The non-transitory computer-readable medium of claim 69, wherein to coordinate with the parent node, the computer executable instructions, when executed by the at least one processor, causes the child node to the coordinating comprises:

transmit a feedback signal to the parent node in response to receipt of the schedule from the parent node, the feedback signal indicating whether the child node supports the configuration for the additional communication provided in the schedule; and receive, from the parent node, an updated schedule in response to the feedback signal when the child node is configured to support the configuration provided in the schedule.

71. The non-transitory computer-readable medium of claim 62, wherein the CU has labeled the allocation of resources for at least the child node as HARD, wherein the type of the communication with the second node is determined based on a labeling of the allocation of resources.

72. The non-transitory computer-readable medium of claim 62, wherein the computer executable instructions, when executed by the at least one processor, further causes the child node to:

receive, from the parent node, a third indication that the allocation of resources are available, wherein the child node utilizes the allocation of resources in accordance with the third indication from the parent node.

73. The non-transitory computer-readable medium of claim 72, wherein to coordinate with the parent node, the computer executable instructions, when executed by the at least one processor, causes the child node to:

transmit, to the parent node, a feedback signal prior to receiving the third indication from the parent node that the allocation of resources are available, wherein the feedback signal includes one or more capabilities or conditions of a spatial division multiplex (SDM) operation of the child node.

74. The non-transitory computer-readable medium of claim 73, wherein the feedback signal includes a schedule for the child node to communicate with the parent node.

75. The non-transitory computer-readable medium of claim 73, wherein the feedback signal includes suggested conditions in a manner in which the parent node utilizes its allocation of resources.

76. The non-transitory computer-readable medium of claim 72, wherein the third indication, from the parent node, that the allocation of resources are available further indicates whether use of the allocation of resources by the child node is unconditional or subject to conditions.

77. The non-transitory computer-readable medium of claim 72, wherein to coordinate with the parent node, the computer executable instructions, when executed by the at least one processor causes the child node to:

transmit, to the parent node, a feedback signal after utilizing the allocation of resources, the feedback signal including one or more capabilities or conditions of a spatial division multiplex (SDM) operation of the child node; and receive, from the parent node, an updated schedule in response to the feedback signal when the parent node is configured to support the SDM operation of the child node.

78. The non-transitory computer-readable medium of claim 77, wherein the feedback signal includes a schedule including a configuration for additional communication between the parent node and the child node.

79. The non-transitory computer-readable medium of claim 72, wherein the CU has labeled the allocation of resources for the child node as SOFT, wherein the type of the communication with the second node is based on a labeling of the allocation of resources.

80. The non-transitory computer-readable medium of claim 62, wherein the type determined for the communication comprises a spatial division multiplex (SDM) operation between the child node and the parent node.

* * * * *